(12) United States Patent
Inoue et al.

(10) Patent No.: US 6,421,303 B1
(45) Date of Patent: Jul. 16, 2002

(54) MULTILAYER RESONANCE DEVICE AND MAGNETO-OPTICAL RECORDING MEDIUM WITH MAGNETIC CENTER LAYER OF A DIFFERENT THICKNESS THAN THAT OF THE COMPONENTS OF THE REFLECTING LAYERS, AND METHOD OF REPRODUCING THE SAME

(75) Inventors: Mitsuteru Inoue; Kenichi Arai, both of Sendai; Toshitaka Fujii, Toyohashi; Masanori Abe, Tokyo; Koji Matsumoto, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/187,649

(22) Filed: Nov. 6, 1998

Related U.S. Application Data

(63) Continuation-in-part of application No. 09/097,746, filed on Jun. 16, 1998, now Pat. No. 6,262,949.

(30) Foreign Application Priority Data

Nov. 14, 1997 (JP) .............................. 9-313905
Aug. 26, 1998 (JP) ........................... 10-240848

(51) Int. Cl.⁷ .......................... G11B 11/00; G11B 7/24
(52) U.S. Cl. ............... 369/13; 369/275.1; 428/694 MM
(58) Field of Search ................. 369/13, 288, 275.2, 369/275.4, 275.3, 284, 275.1, 283, 275.5; 360/59, 131, 135, 114; 359/128, 342; 385/16, 130; 428/694 MM, 694 ML

(56) References Cited

U.S. PATENT DOCUMENTS

| | | | | |
|---|---|---|---|---|
| 5,216,663 A | * | 6/1993 | Tsutsumi et al. | 369/275.2 |
| 5,341,349 A | | 8/1994 | Kagami et al. | 369/13 |
| 5,419,999 A | * | 5/1995 | Uejima | 430/290 |
| 5,648,163 A | * | 7/1997 | Hintz | 428/332 |
| 5,650,992 A | | 7/1997 | Ohkubo | 369/275.1 |
| 5,882,759 A | * | 3/1999 | Hirotsune et al. | 428/64.1 |
| 5,959,961 A | * | 9/1999 | Matsui | 369/275.1 |

FOREIGN PATENT DOCUMENTS

| JP | 58160922 | 9/1983 |
|---|---|---|
| JP | 1054965 | 2/1998 |

OTHER PUBLICATIONS

Magnetic Society of Japan, pp. 131–134, vol. 7, No. 2 (1983), entitled "Faraday Rotation Device Utilizing Fabry Perot Resonance," by M. Gomi, M. Saito, and M. Abe.

A summary of a lecture from the 21st Annual Conference of the Magnetics Society of Japan (1997), p. 284, entitled "Design of Magneto Optical Films with Disordered Multilayer Structures by Genetic Algorithm," by M. Inoue, K.I. Arai, T. Fujii, and M. Abe.

Material from the 57th Committee for Amorphous Nano-–Materials of the Japan Society of the Promotion of Science (1997), pp. 19–24, entitled "Light Localization and Magnet–Optical Effect in Nano Structure."

* cited by examiner

Primary Examiner—Ali Neyzari
(74) Attorney, Agent, or Firm—Greer, Burns & Crain, Ltd.

(57) ABSTRACT

A multilayer resonance device of the invention includes regularly stacked layers each formed by alternately stacking a magnetic substance and a dielectric substance with thickness regularity, and an irregular layer including a magnetic substance, having a thickness disaccording with the thickness regularity and disposed between the regularly stacked layers. Thus, the multilayer resonance device can attain a large Faraday rotation angle, a large magneto-optical effect, and a practical total layer thickness.

11 Claims, 29 Drawing Sheets

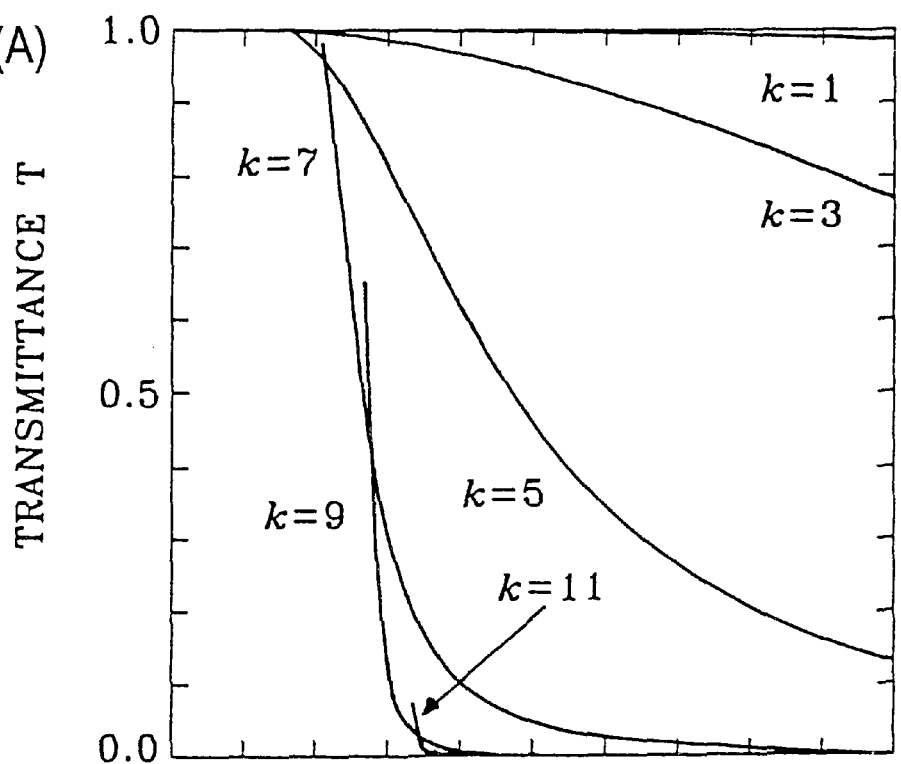
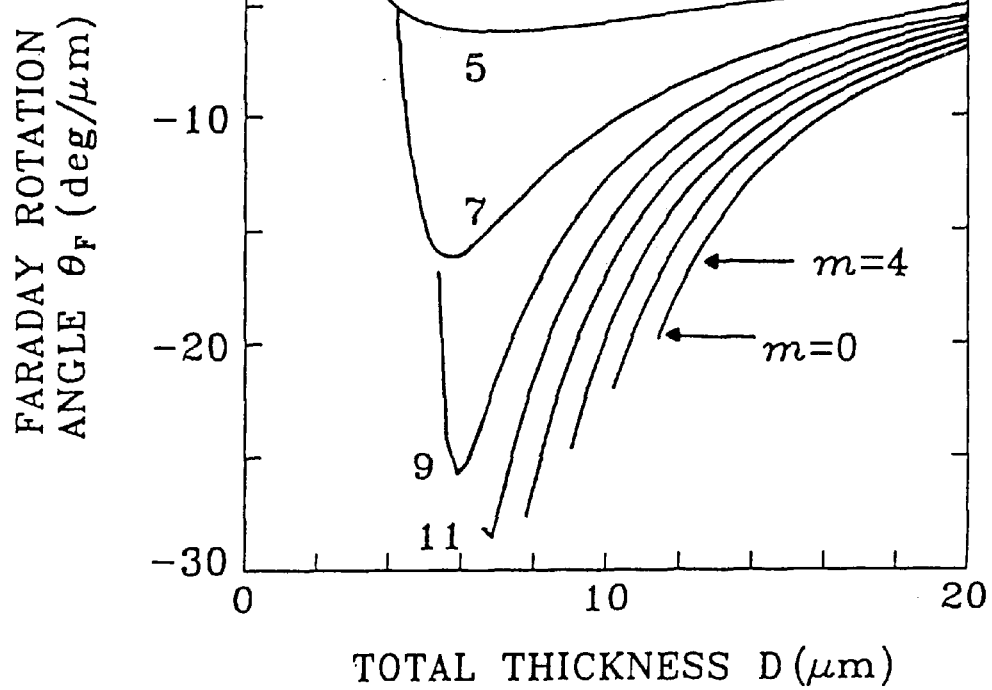

MULTILAYER RESONANCE DEVICE AND MAGNETO-OPTICAL RECORDING MEDIUM WITH MAGNETIC CENTER LAYER OF A DIFFERENT THICKNESS THAN THAT OF THE COMPONENTS OF THE REFLECTING LAYERS, AND METHOD OF REPRODUCING THE SAME

This application is a continuation-in-part of application Ser. No. 09/097,746 filed Jun. 16, 1998, now U.S. Pat. No. 6,262,949.

BACKGROUND OF THE INVENTION

The present invention relates to a multilayer resonance device for use in a device utilizing a magneto-optical effect and to a magneto-optical recording medium for recording/reproducing information through a magneto-optical recording/reproducing operation.

In the recent PC (personal computer) environment for dealing with dynamic image data, a magneto-optical recording medium, which has been widely used as a data recording device for a computer, is required to have a larger recording capacity, namely, there is a demand for a magneto-optical disk capable of high density recording. In order to increase a packing density, it is necessary to form short recording marks, but such short recording marks decrease a reproducing signal output due to waveform interference between the marks. Therefore, as a reproducing method for obtaining a reproducing signal without causing the waveform interference between the marks, various types of magnetically induced super resolution technique have been proposed. However, a magnetically induced super resolution medium has a structure including stacked layers of plural magnetic layers respectively having different magnetic characteristics, and hence, it is very difficult to control the magnetic characteristic and the exchange coupled force among the magnetic layers. Therefore, mass-production of such a medium is difficult. In addition, it is disadvantageously necessary to set recording/reproducing apparatus in accordance with the layer structure of the medium.

Furthermore, in a general magneto-optical disk, for example, in a magneto-optical disk having a structure including a SiN layer, a TbFeCo layer, another SiN layer and an aluminum layer successively stacked in this order on a substrate, an incident laser beam is made not to be reflected within the layers in order to attain a large magneto-optical effect. However, even in a magneto-optical disk using this non-reflection condition, it is impossible to obtain a Kerr rotation angle larger than one degree, and hence, such a disk is not suitable to reproducing short recording marks. Moreover, in a magneto-optical disk utilizing optics using evanescent light, that is, so-called near-filed optics, a reproducing signal output is so small that a medium for attaining a larger magneto-optical effect is demanded.

On the other hand, in the field of an optical isolator, a garnet monocrystal layer including YIG (yttrium-iron-garnet) as a main component is used, but the use is limited because light loss cannot be avoided. As a countermeasure, the present inventors and applicant have found that an optical isolator having a multilayer structure formed by alternately stacking a garnet monocrystal layer including YIG as a main component and a dielectric substance can attain a large magneto-optical effect and a high transmittance and can be free from light loss. Also, as a result of development of this finding, the present inventors and applicant have proposed a magneto-optical multilayer layer in Japanese Patent Application Laid-Open No. 10-54965 (1998)

The magneto-optical multilayer layer disclosed in Japanese Patent Application Laid-Open No. 10-54965 (1998) has a structure in which a magnetic substance and a dielectric substance are alternately stacked with their thicknesses irregularized, and can attain a very large magneto-optical effect. However, the number of stacked layers is large, and hence, the total thickness is large. Therefore, this magneto-optical multilayer layer is disadvantageously difficult to practically apply to a device utilizing a magneto-optical effect such as a microcavity and the aforementioned magneto-optical recording medium.

BRIEF SUMMARY OF THE INVENTION

The present invention was devised to overcome the aforementioned problems. One object of the invention is providing a multilayer resonance device which can attain a large magneto-optical effect with a practical thickness by disposing regularly stacked layers each formed by alternately stacking a magnetic substance and a dielectric substance with thickness regularity, and an irregular layer including a magnetic substance and having a thickness disaccording with the thickness regularity to be sandwiched therebetween.

Another object of the invention is providing a multilayer resonance device which can attain a large magneto-optical effect with a practical thickness by disposing regularly stacked layers each formed by alternately stacking different dielectric substances with thickness regularity, and an irregular layer including a magnetic substance and having a thickness disaccording with the thickness regularity to be sandwiched therebetween.

Still another object of the invention is providing a magneto-optical recording medium capable of high output reproduction even when a light beam with a short wavelength is used by disposing the aforementioned multilayer resonance device on a substrate.

The multilayer resonance device of this invention comprises two regularly stacked layers each formed by alternately stacking a magnetic substance and a dielectric substance with thickness regularity; and an irregular layer including at least a magnetic substance, disposed between the regularly stacked layers and having a thickness disaccording with the thickness regularity.

Thus, reflection layers each formed by alternately stacking the magnetic substance and the dielectric substance are disposed so as to sandwich the magnetic substance, and hence, a large rotation of a polarization plane can be attained.

Alternatively, the multilayer resonance device of this invention comprises two regularly stacked layers each formed by alternately stacking different dielectric substances with thickness regularity; and an irregular layer including at least a magnetic substance, disposed between the regularly stacked layers and having a thickness disaccording with the thickness regularity.

Thus, the dielectric substances are alternately stacked, and hence, a multilayer layer working as a reflection layer can be easily formed.

In the multilayer resonance device, the regularly stacked layers together have a stacked structure symmetrical with respect to the irregular layer.

Since the layer structure is symmetrical with respect to the irregular layer, the resonance effect can be enhanced.

Alternatively, the multilayer resonance device of this invention comprises first and second optical layers having different optical characteristics and respectively having first and second thicknesses determined in accordance with the optical characteristics thereof, which are alternately stacked to form a multilayer stacked layer; and a magnetic layer disposed substantially at the center of the multilayer stacked layer and having a thickness different from the first and second thicknesses.

Thus, the optical layers having peculiar optical characteristics, such as a magnetic substance and a dielectric substance, are stacked into a predetermined thickness. Therefore, an interference layer in which light is localized at the center is formed, so that the magnetic layer disposed substantially at the center of the multilayer resonance layers can exhibit a large magneto-optical effect.

The magneto-optical recording medium of this invention comprises a first regularly stacked layer formed by alternately stacking different dielectric substances with thickness regularity; a magnetic layers having a thickness disaccording with the thickness regularity, for recording and storing information; and a second regularly stacked layer with the same thickness regularity as the first regularly stacked layer, wherein the first regularly stacked layer, the magnetic layer and the second regularly stacked layer are stacked in this order.

Accordingly, a light beam irradiating through a substrate is resonated between the first regularly stacked layer, the magnetic layer and the second regularly stacked layer, so that the magnetic layer for recording and storing information can attain a large magneto-optical effect.

In the magneto-optical recording medium, the first regularly stacked layer and the second regularly stacked layer together have a stacked structure symmetrical with respect to the magnetic layer.

Accordingly, since the layer structure is symmetrical with respect to the magnetic layer for recording and storing information, the resonance effect can be enhanced.

In the magneto-optical recording medium, the magnetic layer includes rare earth—transition metal.

Thus, since the rare earth—transition metal such as TbFeCo and DyFeCo is used in the magnetic layer, the formation of the layer can be eased.

In the magneto-optical recording medium, a reflection layer including a metal is formed on the first or second regularly stacked layer on a surface not in contact with the magnetic layer.

Thus, since the reflection layer including the metal is provided, the temperature distribution on the medium can be controlled.

In the magneto-optical recording medium, a recording mark with a dimension smaller than a spot diameter of the light beam is formed in the magnetic layer.

Accordingly, since a light beam having a specific wavelength is resonated in accordance with a temperature, the magneto-optical effect can be enhanced merely in a predetermined temperature area in the temperature distribution caused by irradiation with the light beam in a reproducing operation. Therefore, a large magneto-optical effect can be attained in a part of the beam spot, and a recording mark smaller than the spot diameter can be read. In this manner, the super resolution reproduction can be conducted, resulting in realizing high density recording.

Alternatively, the magneto-optical recording medium of this invention comprises the aforementioned multilayer resonance device.

Accordingly, information is recorded in the irregular layer or the magnetic layer disposed substantially at the center. As a result, a large magneto-optical effect can be attained and a large reproducing output can be obtained.

Another object of the invention is providing a magneto-optical recording medium that can exhibit a further larger magneto-optical effect. Still another object of the invention is providing a method of reproducing a magneto-optical recording medium in which information recorded in a high density can be reproduced by dividing a reproducing signal into three or more levels in reproducing the magneto-optical recording medium. Furthermore, still another object of the invention is providing a method of reproducing a magneto-optical recording medium in which information can be reproduced with higher output level by obtaining a rotation angle of a polarization plane of light irradiating the magneto-optical recording medium to be used as a reproducing signal.

In the magneto-optical recording medium of this invention, each of the first regularly stacked layer and the second regularly stacked layer includes three or more pairs of the different dielectric substances alternately stacked.

Accordingly, since each of the first and second regularly stacked layers is formed by stacking three or more pairs of dielectric substances, a further larger magneto-optical effect can be attained, resulting in obtaining high reproducing output level.

In the magneto-optical recording medium of this invention, the number of pairs of the different dielectric substances alternately stacked in the first regularly stacked layer is different from the number of pairs of the different dielectric substances alternately stacked in the second regularly stacked layer.

Accordingly, since the numbers of pairs of the dielectric substances are different in the first and second regularly stacked layers, the regularly stacked layer including a larger number of pairs has a higher reflectance than the other regularly stacked layer including a smaller number of pairs. Therefore, when the reproducing light irradiates a face of the magneto-optical recording medium closer to the regularly stacked layer including a smaller number of pairs, the reflectance of the entire resonance layer can be improved without degrading the magneto-optical effect.

In the magneto-optical recording medium of this invention, the numbers of the stacked dielectric substances in the first regularly stacked layer and the second regularly stacked layer are different from each other.

Accordingly, since the numbers of stacked dielectric substances are different in the first and second regularly stacked layers, the regularly stacked layer including a larger number of stacked dielectric substances has a larger reflectance than the other regularly stacked layer including a smaller number of stacked dielectric substances. Therefore, when the reproducing light irradiates a face of the magneto-optical recording medium closer to the regularly stacked layer including a smaller number of stacked dielectric substances, the reflectance of the entire resonance layer can be improved without degrading the magneto-optical effect.

In the magneto-optical recording medium of this invention, $SiO_2$ and SiN are used as the dielectric substances.

Accordingly, when the magnetic layer is formed out of, for example, a rare earth transition metal amorphous alloy, the magnetic layer can be protected from degradation such as oxidation by using a SiN film with a superior protecting effect as the dielectric substance.

In the magneto-optical recording medium of this invention, each of the dielectric substances has a thickness defined on the basis of a wavelength of light used in optical reproduction and a refractive index of the dielectric substance as follows:

$$t < \lambda/(4M)$$

wherein t indicates the thickness of the dielectric substance, λ indicates the wavelength of the light and M indicates the refractive index of the dielectric substance.

Since the optical length of the center portion of the resonance layer is shifted to be longer than the resonance wavelength, the actual resonance wavelength is shifted to be longer than the theoretical resonance wavelength. Therefore, when the dielectric substance has a thickness smaller than λ/(4M), the thickness according with the actual resonance wavelength can be attained.

In the method of reproducing a magneto-optical recording medium of this invention, information recorded in the magnetic layer is reproduced by irradiating a face of the magneto-optical recording medium, with a light beam, closer to either the first or the second regularly stacked layer including a smaller number of pairs of dielectric substances or a smaller number of stacked dielectric substances.

Accordingly, since the numbers of pairs of the dielectric substances or the numbers of stacked dielectric substances included in the first and second regularly stacked layers are different from each other, the regularly stacked layer including a larger number of pairs of the dielectric substances or a larger number of stacked dielectric substances has a larger reflectance than the other regularly stacked layer. Therefore, when the reproducing light irradiates a face of the magneto-optical recording medium closer to the regularly stacked layer including a smaller number of pairs of dielectric substances or a smaller number of stacked dielectric substances, the reflectance of the entire resonance layer can be improved without degrading the magneto-optical effect.

The method of reproducing a magneto-optical recording medium of this invention comprises the steps of obtaining a reproducing signal on the basis of a beam light reflected on the magneto-optical recording medium; dividing the obtained reproducing signal into three or more levels; and reproducing information on the basis of the reproducing signal by using previously obtained information patterns corresponding to the respective levels.

Since each of the three or more levels obtained by dividing the reproducing signal corresponds to an information pattern of plural bits, information of plural bits can be reproduced from a reproducing signal, for example, corresponding to one spot area of the reproducing light. Accordingly, information recorded in a high density by using a recording mark smaller than the spot of the reproducing light can be accurately reproduced.

The method of reproducing a magneto-optical recording medium of this invention comprises the steps of receiving a light beam reflected by the magneto-optical recording medium; detecting a rotation angle of a polarization plane of the received light beam; and reproducing information by using the detected rotation angle as a reproducing signal.

Also, in the method of reproducing a magneto-optical recording medium of this invention, in the step of receiving the reflected light beam, the reflected light beam having passed through an analyzer rotatable about a light transmission axis is received, and in the step of detecting the rotation angle of the polarization plane, the rotation angle of the polarization plane is detected on the basis of a rotation angle of the analyzer.

Moreover, in the method of reproducing a magneto-optical recording medium of this invention, in the step of receiving the reflected light beam, the reflected light beam having passed through an analyzer invertible about a light transmission axis in a predetermined angle range is received, and in the step of detecting the rotation angle of the polarization plane, the rotation angle of the polarization plane is detected on the basis of a rotation angle of the analyzer.

The rotation angle of the polarization plane of the light reflected by the magneto-optical recording medium, namely, the Kerr rotation angle, is directly detected by, for example, rotating or inverting the analyzer. Thus, there is no need to detect the intensity variation of the signal. Accordingly, for example, even when the reflectance of the magneto-optical recording medium is not very high, information can be accurately reproduced because the Kerr rotation angle is large.

The above and further objects and features of the invention will more fully be apparent from the following detailed description with accompanying drawings.

BRIEF DESCRIPTION OF THE SEVERAL VIEWS OF THE DRAWINGS

FIGS. 6(A) and 6(B) are graphs for showing a transmittance and a Faraday rotation angle against a total thickness of FIG. 5;

DETAILED DESCRIPTION OF THE INVENTION

The present inventors have made a report on a multilayer resonance layer which has a Fabry-Perot type microcavity structure and can enhance a magneto-optical effect in a summary of the 21st Lecture of Magnetic Society of Japan (1997), p. 284 and in a document (9.10.15), p.p. 19–24, for the 57th study meeting of the 147th committee for amorphous nano-materials of Japan Society for the Promotion of Science, Prior to description of preferred embodiments of the invention, this multilayer resonance layer will be described first.

The enhancement of a magneto-optical effect by a Fabry-Perot resonator is reported in "Faraday rotation device utilizing Fabry-Perot resonance", the transactions of the Magnetic Society of Japan, p. 131, vol. 7, No. 2, 1983. In this report, a magnetic bubble LPE (liquid phase epitaxial) garnet is used as a magnetic substance. A Faraday rotation angle can be enhanced by this resonator up to approximately twice as large as the peculiar magneto-optical effect, and the enhanced angle is substantially the same as a Faraday rotation angle attained by a structure adopting the non-reflection condition.

The present inventors found that a multilayer resonance layer having a given layer structure with a comparatively small number of stacked layers can attain a high resonance and exhibit a very large magneto-optical effect. First, the magneto-optical effect of a multilayer layer obtained by stacking a Bi—YIG (yttrium-iron-garnet) layer and a $SiO_2$ layer, which is expected to be a next generation magneto-optical recording medium, was examined.

Figure 1:
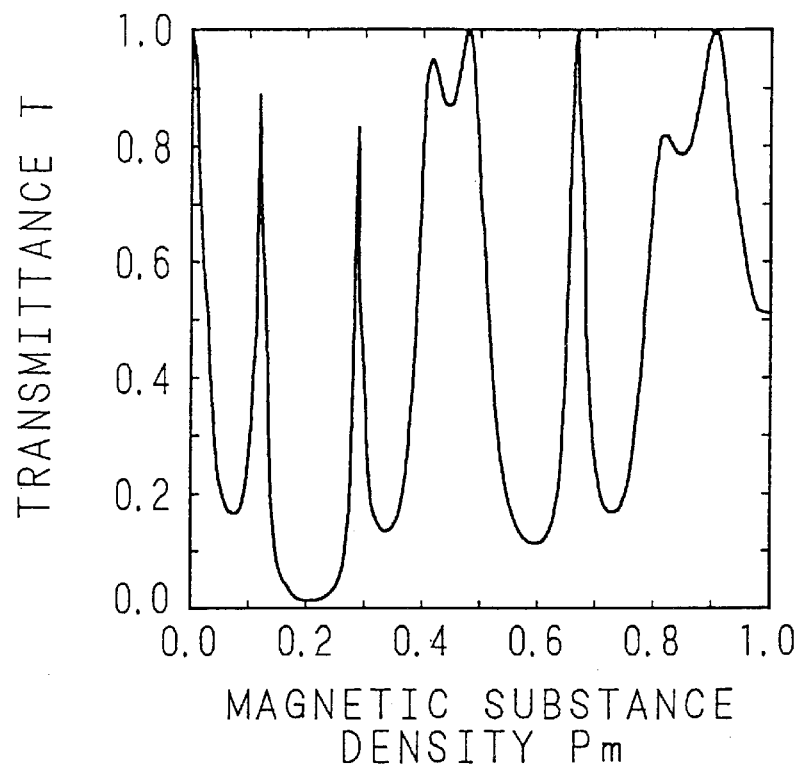
FIGS. 1(A) and 1(B) are graphs for showing a transmittance, a Faraday rotation angle and a total rotation angle against a magnetic substance density of a multilayer resonance layer according to the invention.
Figure 1:
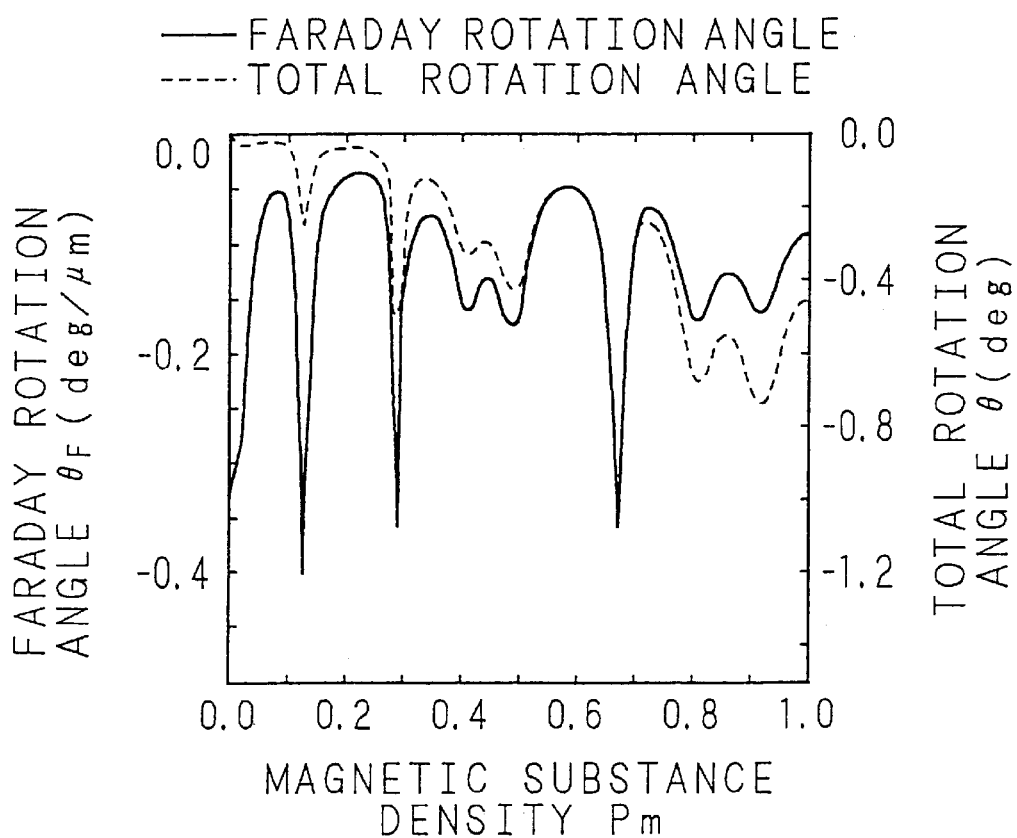

When the number of stacked layers of the Bi—YIG layer is indicated as Nm, the number of stacked layers of the $SiO_2$ layer is indicated as Ns, one Bi—YIG layer is represented by a symbol "1", and one $SiO_2$ layer is represented by a symbol "0", the arrangement of the Bi—YIG layers and the $SiO_2$ layers can be represented by a binary number of N figures (the Nth power of b). The layer structure can be uniquely defined by using this binary structure factor bN and a magnetic substance density Pm=Nmdm/D determining a thickness dm of one Bi—YIG layer (or a thickness ds of one $SiO_2$ layer). Therefore, an optimal layer structure was defined through calculation. It was assumed that N=16, and with regard to a 16-layer layer having the binary structure factor bN of (ABAA)hex, a Faraday rotation angle $\theta_F$ and a total rotation angle $\theta$ (=$\theta_F$×Nm×dm) against the magnetic substance density Pm were obtained. The results are shown in FIG. 1, wherein the abscissa indicates the magnetic substance density and the ordinates indicate the transmittance, the Faraday rotation angle and the total rotation angle. As is obvious from this graph, a high transmittance and a large Faraday rotation angle $\theta_F$ can be attained at given magnetic substance densities Pm of 0.09, 0.123, 0.291 and 0.668.

Figure 2:
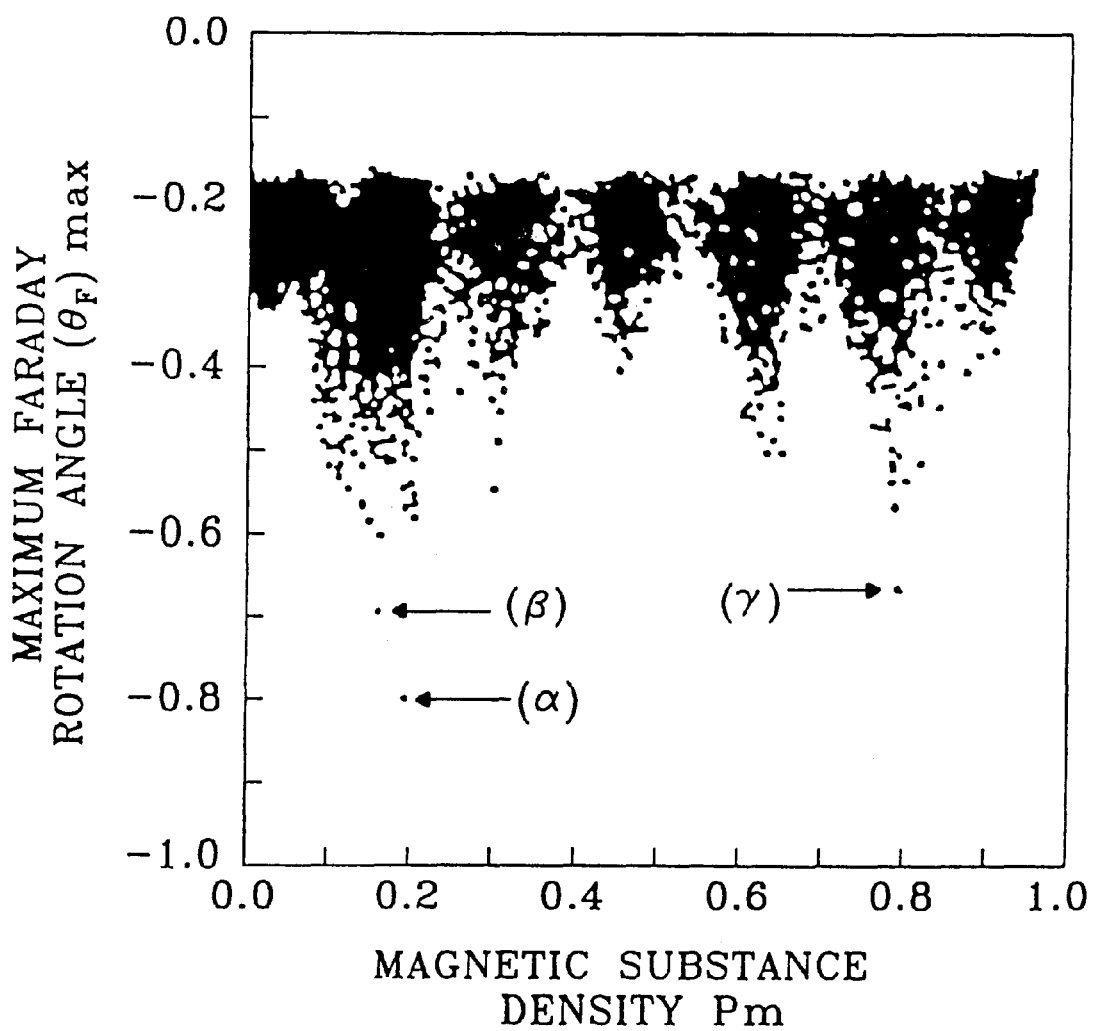
FIG. 2 is a graph for showing a maximum Faraday rotation angle against a magnetic substance density of the multilayer resonance layer of the invention.

Next, in order to find a larger Faraday rotation angle $\theta_F$, values of the Faraday rotation angle $\theta_F$ against the magnetic substance density Pm were checked with regard to all the combinations of (ABAA)hex for multilayer layers. The results are shown in FIG. 2, wherein the abscissa indicates the magnetic substance density Pm and the ordinate indicates the maximum Faraday rotation angle $(\theta_F)$max. As is obvious from this graph, a definitely large Faraday rotation angle $\theta_F$ can be obtained apart from the periodical variation of the Faraday rotation angle $\theta_F$. The binary structure factors of such multilayer layers are:

(α) bN=1010101011010101
(β) bN=1010100111010101
(γ) bN=1010101111110101

In all of these multilayer layers, a $SiO_2$ layer and a Bi—YIG layer having a thickness corresponding to plural unit thicknesses is present in the vicinity of the center of the stacked structure formed by regularly alternately stacking the Bi—YIG layer and the $SiO_2$ layer.

Next, a multilayer layer including a Bi—YIG layer with a thickness corresponding to two unit thicknesses sandwiched between 16 Bi—YIG/$SiO_2$ layers and 16 $SiO_2$/Bi—YIG layers was examined for its characteristic. The multilayer layer having this structure exhibited a substantially total reflection characteristic in a range of 0.2≦Pm≦0.8, but transmits light at a magnetic substance density Pm of 0.4585 alone. This corresponds to a new electron level is generated in a forbidden band due to an impurity included in crystal, which can be regarded as a characteristic of photonic crystal. In accordance with this peculiar transmitting property, a layer having Pm of 0.4585 can attain a Faraday rotation angle $\theta_F$ as large as −16 deg/$\mu$m, which is approximately 160 times as large as that of a Bi—YIG single layer.

Figure 3:
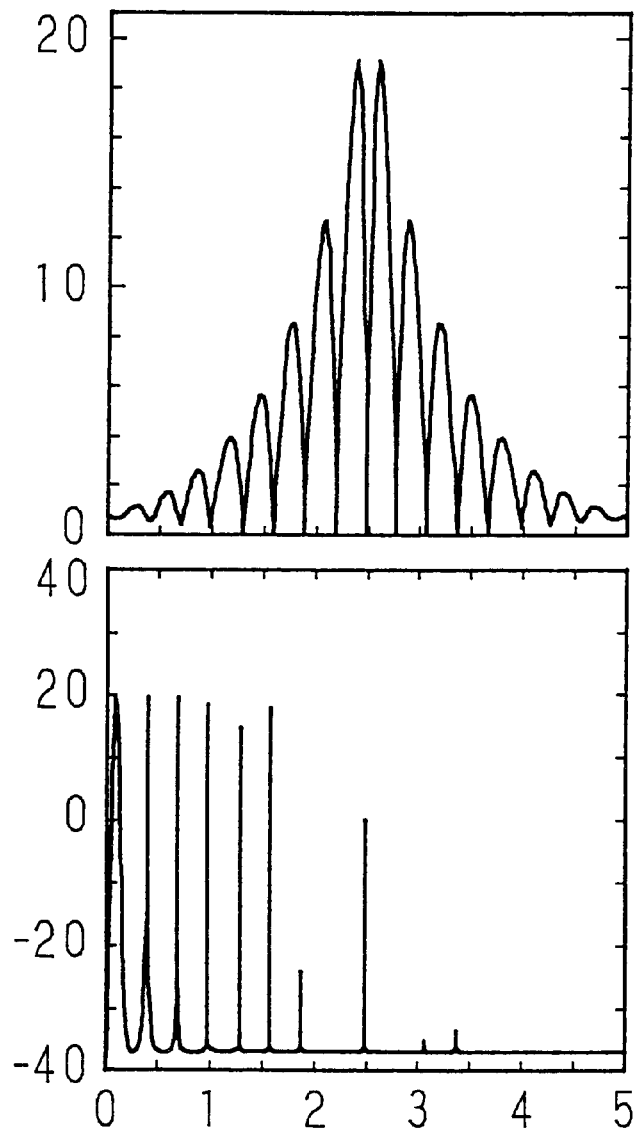
FIGS. 3(A) and 3(B) are graphs for showing variation of a field strength in a direction along the thickness of an interference layer and a rotation angle.
Figure 4:
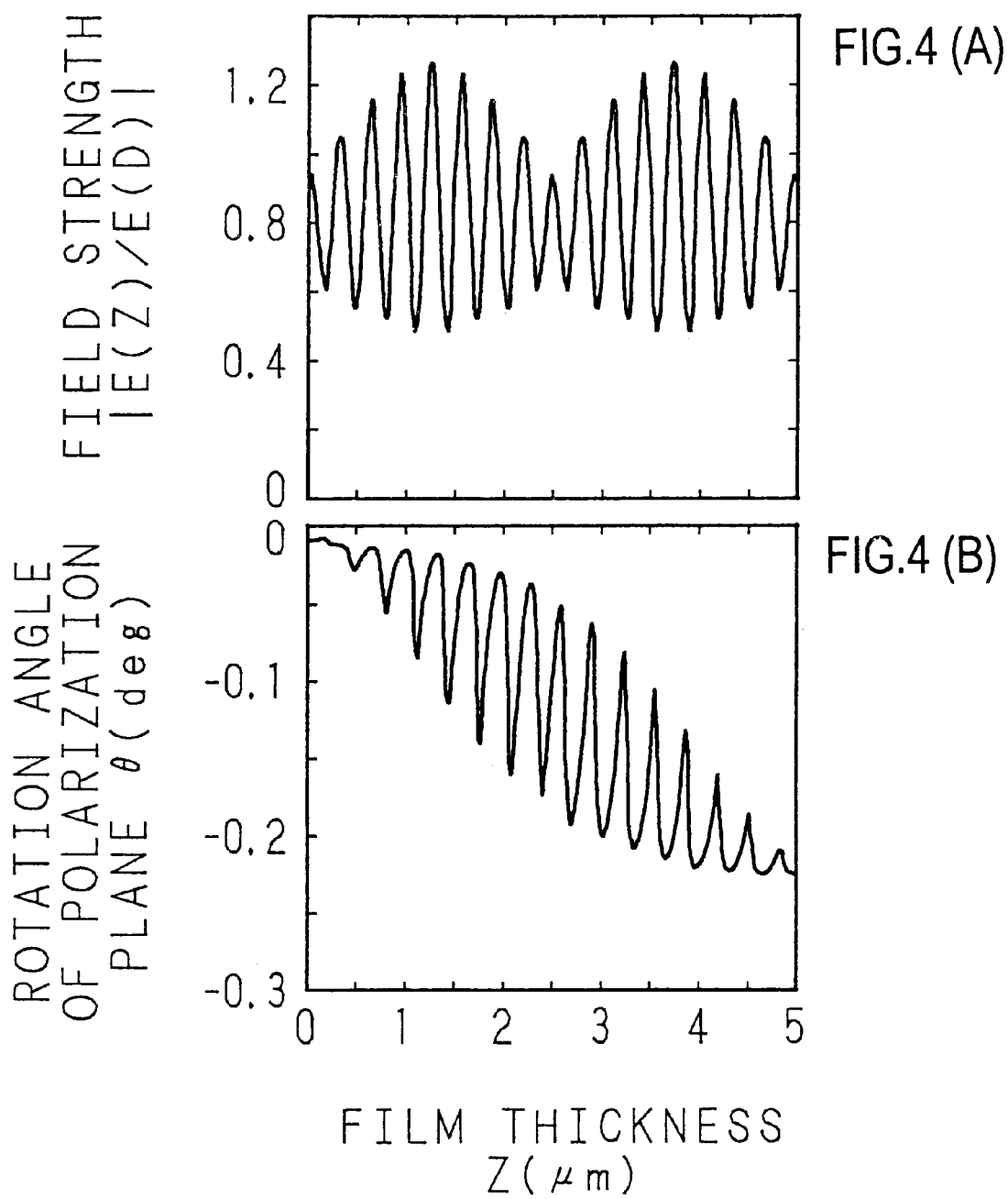
FIGS. 4(A) and 4(B) are graphs for showing variation of a field strength in a direction along the thickness of a non-reflection layer and a rotation angle.

In order to check a difference between a non-reflection layer (having Pm of 0.1141) and an interference layer (having Pm of 0.4585) in this multilayer layer, the variation of a field strength in a direction along the thicknesses of these layers and a rotation angle $\theta$ of a polarization plane were examined. The results are shown in FIGS. 3(A), 3(B), 4(A), and 4B. FIGS. 3(A) and 3(b) show the variation in the interference layer and FIGS. 4(A) and 4(B) show the variation in the non-reflection layer, in both of which the abscissa indicates the layer thickness and the ordinates indicate the field strength and the rotation angle of the polarization plane. As is shown in FIGS. 3(A), 3(B), 4(A) and 4(B), light is distributed over the entire layer like a standing wave in the non-reflection layer, but in the interference layer, light is strongly localized at the center. This localization can be regarded to cause the peculiar transmitting property and the large magneto-optical effect.

Figure 5:
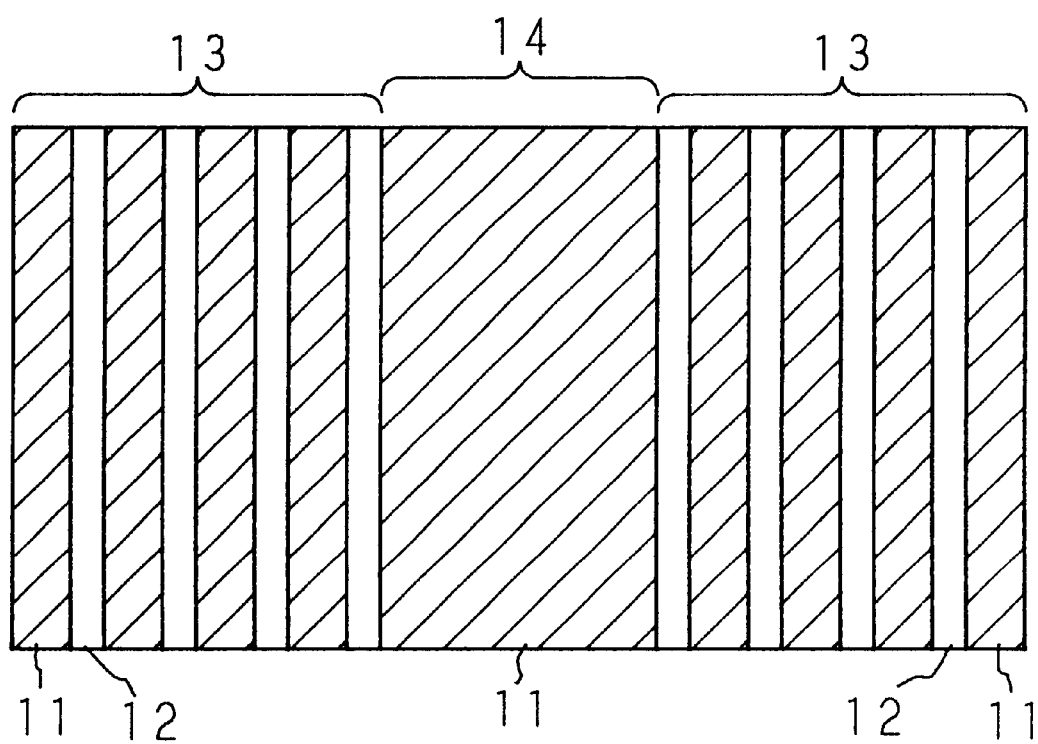
FIG. 5 is a sectional view for showing the layer structure of photonic crystal having a Fabry-Perot structure.

In view of the aforementioned examination results, the transmittance and the magneto-optical effect of photonic crystal in the Fabry-Perot structure having the strong light localization were examined. FIG. 5 is a sectional view for showing the layer structure of this multilayer resonance layer, in which magnetic layers are hatched. A center layer 14, that is, an irregular layer, is sandwiched between reflection layers 13, that is, regularly stacked layers, formed by alternately stacking a magnetic layer 11 of Bi—YIG and a dielectric layer 12 of SiO$_2$. The thicknesses of the respective layers were selected as follows so as to satisfy the conditions for the Fabry-Perot resonance:

$$dm \cdot Nm = ds \cdot Ns = \lambda/4$$

$$Dm \cdot Nm = m\, \lambda/2\ (m=0, 1, 2, 3, \ldots)$$

wherein $\lambda=1.15$ $\mu$m (a resonance wavelength), and Nm (=2.36) and Ns (=1.58) are refractive indexes of the Bi—YIG layer and the SiO$_2$ layer, respectively.

FIGS. 6(A) and 6(B) are graphs for showing the transmittance and the Faraday rotation angle against the total thickness of this multilayer resonance layer, wherein the abscissa indicates the total thickness and the ordinates indicate the transmittance and the Faraday rotation angle. In the graph, the number $\kappa$ of the layers included in the reflection layer 13 and an integer m for determining the thickness of the center layer 14 are selected as parameters. As is obvious from the graph, when $\kappa=11$ and $m=1$, a large Faraday rotation angle of −28 deg/$\mu$m can be attained.

The present inventors further described the following: It was thus found that a large rotation of a polarization plane can be attained by sandwiching a magnetic substance between the reflection layers 13 each formed by alternately stacking a magnetic substance and a dielectric substance. However, it was difficult to form a multilayer layer of the Bi—YIG layers and the SiO$_2$ layers. Therefore, since the reflection layer 13 works to confine light within the multilayer layer, a layer obtained by alternately stacking dielectric layers having different refractive indexes was examined to be used as the reflection layer 13.

A multilayer resonance layer was manufactured by using a Bi—YIG layer as the center layer 14 and sandwiching the center layer 14 between stacked layers of SiO$_2$/TiO$_2$ as the reflection layers 13. This multilayer resonance layer has a structure including 8 (SiO$_2$/TiO$_2$) layers/the Bi—YIG layer/8 (TiO$_2$/SiO$_2$) layers. At this point, SiO$_2$ has a larger refractive index than TiO$_2$. Furthermore, by using the thickness ds and the refractive index ns of SiO$_2$ and the thickness dt and the refractive index nt of TiO$_2$, a condition of ns·ds=nt·dt=$\lambda$/4 was satisfied. Also, the thickness dM and the refractive index nm of the center layer 14 of the Bi—YIG layer were calculated with regard to two cases: one is a case where a condition of nm·dm=$\lambda$/2 was satisfied; and the other is a case where a condition of nm·dm=$\lambda$ was satisfied.

Figure 7:
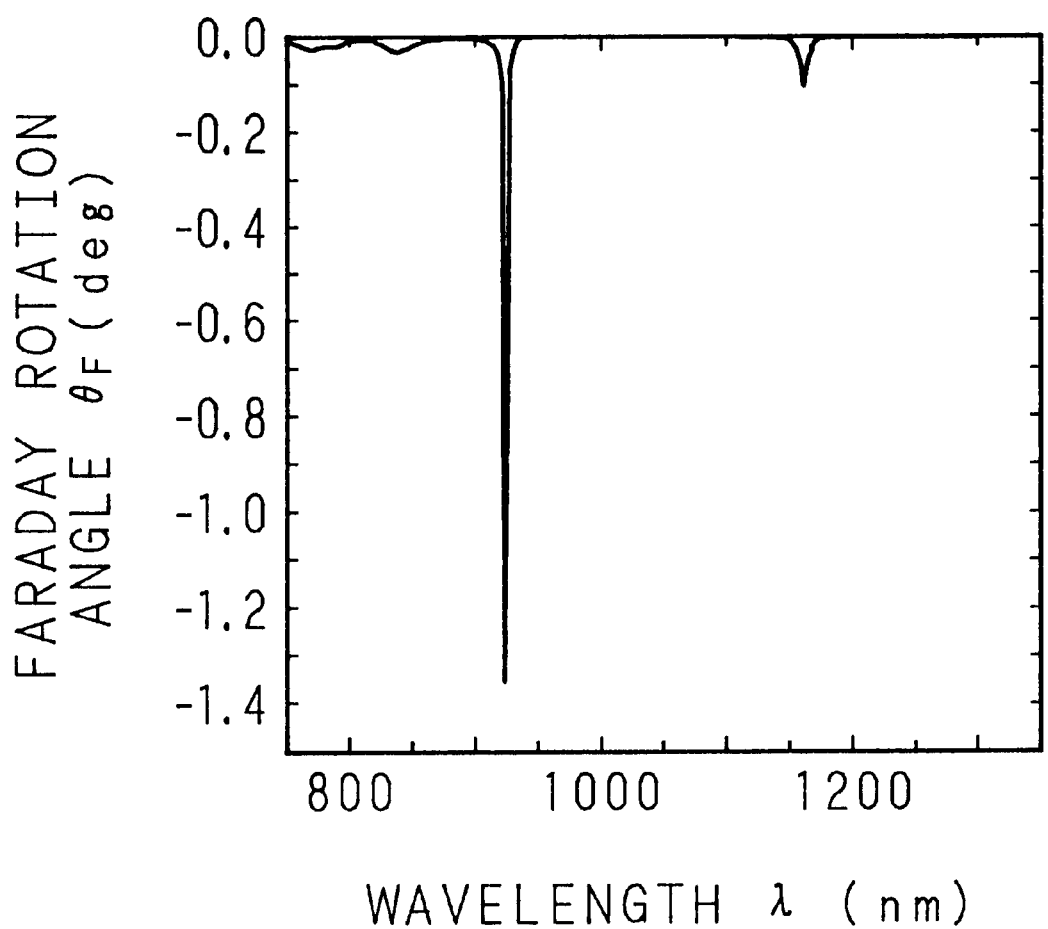
FIG. 7 is a graph for showing a Faraday rotation angle against a wavelength of incident light in the multilayer resonance layer of the invention.
Figure 8:
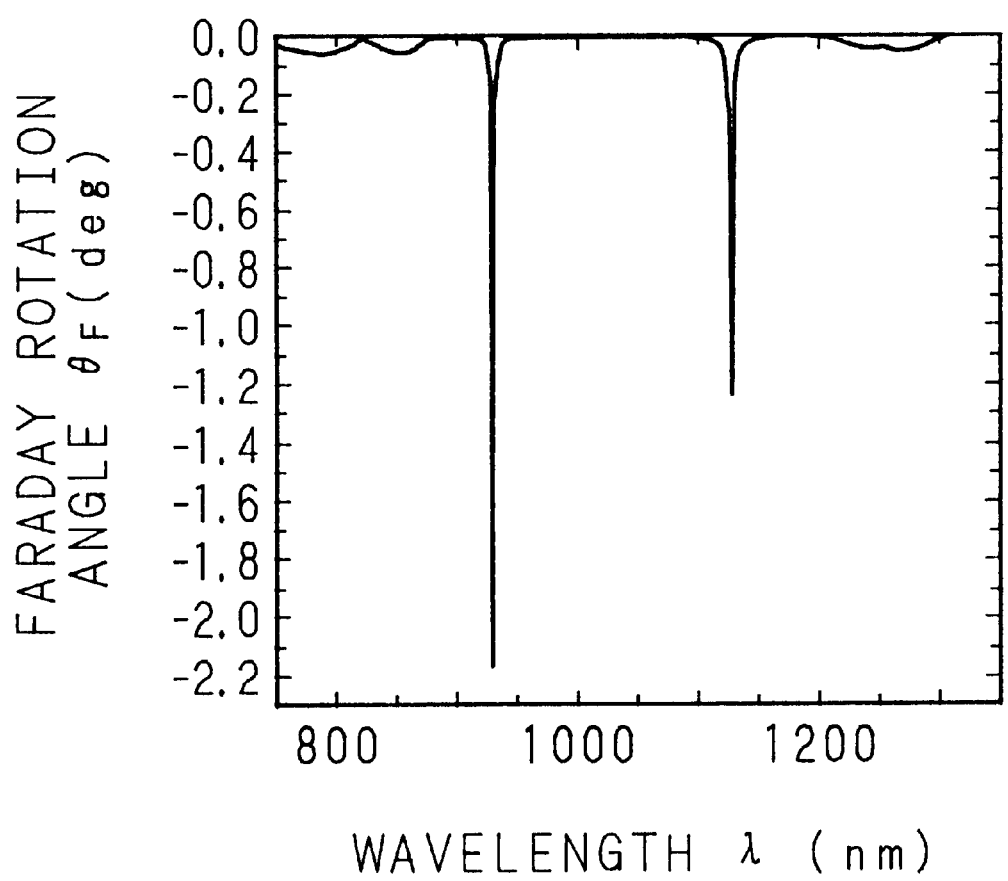
FIG. 8 is a graph for showing a Faraday rotation angle against a wavelength of incident light in another multilayer resonance layer of the invention.

The results are shown in graphs of FIGS. 7 and 8. FIG. 7 shows the result obtained in the case where the condition of nm·dm=$\lambda$/2 is satisfied, and FIG. 8 shows the result obtained in the case where the condition of nm·dm=$\lambda$ is satisfied, in both of which the abscissa indicates the wavelength of incident light and the ordinate indicates the Faraday rotation angle. As is obvious from these graphs, in both the multilayer resonance layers, it was found that a large magneto-optical effect and a high transmittance can be attained at a wavelength where the strong localization is exhibited.

Now, the present invention will be described with reference to the accompanying drawings illustrating preferred embodiments thereof.

Embodiment 1

Figure 9:
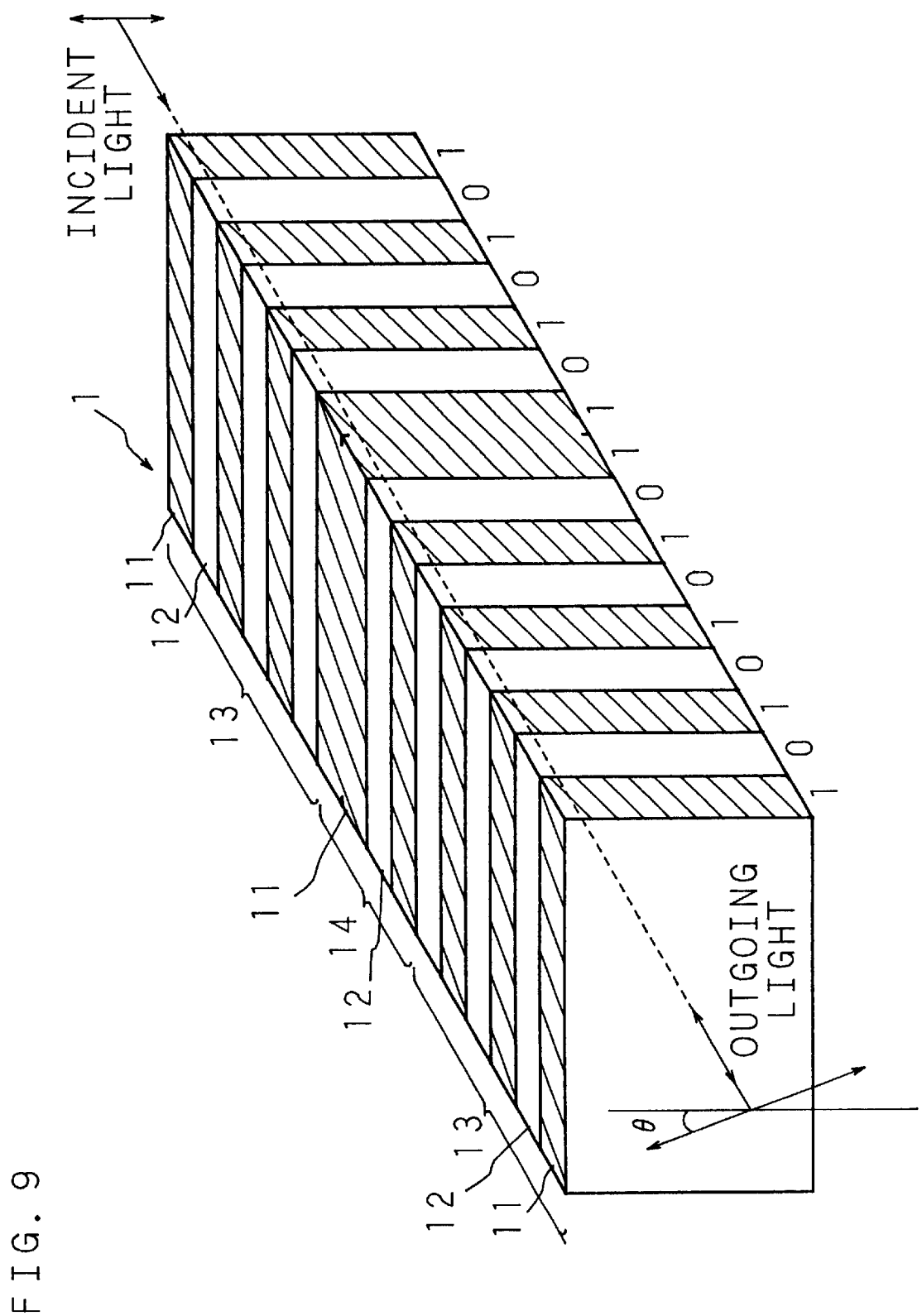
FIG. 9 is a perspective view for showing the structure of a multilayer resonance layer according to a first embodiment.

FIG. 9 is a perspective view for showing the structure of a multilayer resonance layer according to a first embodiment of the invention. As is shown in FIG. 9, the multilayer resonance layer 1 is a 16-layer stacked layer including Bi—YIG layers and SiO$_2$ layers, and has a structure in which a center layer 14 which is a stacked layer of a magnetic layer 11 of Bi—YIG and a dielectric layer 12 of SiO$_2$ is sandwiched between reflection layers 13. The total thickness of the multilayer resonance layer 1 is 5 $\mu$m. Each reflection layer 13 includes the magnetic layers 11 of Bi—YIG and the dielectric layers 12 of SiO$_2$ alternately stacked with their thicknesses regularized, and the two reflection layers 13 together have a layer structure symmetrical with respect to the center layer 14 in the stacking direction. In the reflection layer 13, each magnetic layer 11 has a thickness of 250 nm and each dielectric layer 12 has a thickness of 387 nm. In the center layer 14 sandwiched between the reflection layers 13, the magnetic layer 11 with a thickness of 500 nm, the dielectric layer 12 with a thickness of 250 nm and the magnetic layer 11 with a thickness of 250 nm are stacked. Thus, the respective magnetic and dielectric layers in the center layer 14 have thicknesses disaccording with the thickness regularity of the reflection layer 13. In this multilayer resonance layer 1, the magnetic substance density Pm is 0.458. In FIG. 9, magnetic substances are hatched.

This layer structure of the multilayer resonance layer 1 is represented by bN=1010101011010101, wherein the magnetic layer 11 and the dielectric layer 12 correspond to '1' and '0', respectively. The multilayer resonance layer 1 is manufactured by forming Bi—YIG (BiY$_2$Fe$_5$O$_2$) layers and SiO$_2$ layers through RF sputtering using targets including respective components.

In the multilayer resonance layer 1 having the aforementioned structure, a Faraday rotation angle $\theta_F$ is measured and found to be as large as −20 deg/$\mu$m, which is close to a theoretical value. In this manner, the multilayer resonance layer 1 including the reflection layers 13 stacked at both sides of the center layer 14 can attain a large magneto-optical effect in spite of the number of stacked layers as small as 16 and the thickness as small as 5 $\mu$m.

Embodiment 2

In a second embodiment, a microcavity using two types of dielectric substances having different refractive indexes as a reflection layer will be described. The microcavity has a resonance wavelength of 1 μm, and includes a BiDyFeAlO garnet layer (hereinafter referred to as the BiDyFeAlO layer) as a center layer and a 4-layer stacked layer of $SiO_2$ and $TiO_2$ as a reflection layer. The structures and the forming methods of the respective layers of this microcavity are listed in TABLE 1 below:

TABLE 1

The reflection layers included in this microcavity together have a layer structure symmetrical with respect to the center layer, and the two types of dielectric layers, each having a thickness corresponding to [a wavelength λ of incident light/(4×refractive index M of dielectric)], are alternately stacked. In other words, the two types of dielectric layers are alternately stacked with the thickness regularity. The $SiO_2$ layer has a thickness of 177 nm (=1000/(4×1.42)), and the $TiO_2$ layer has a thickness of 100 nm (=1000/(4×2.5). The center layer 14 composed of the BiDyFeAlO layer has a thickness disaccording with the thickness regularity of the reflection layer, and specifically has a thickness of 160 nm. The total thickness of the microcavity is 1268 nm. In this case, the wavelength λ of incident light is 1000 nm, the refractive index M of the $SiO_2$ layer is 1.42, and the refractive index M of the $TiO_2$ layer is 2.5.

Figure 10A:
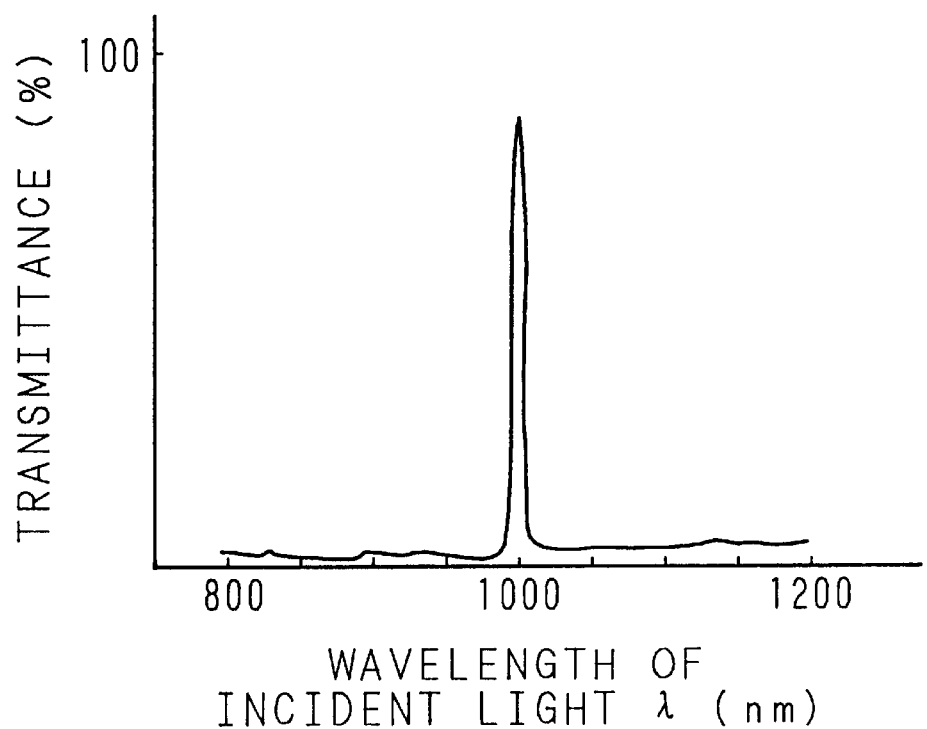
FIGS. 10A and 10B are graphs for showing a transmittance and a Faraday rotation angle against a wavelength of incident light in a microcavity according to a second embodiment.
Figure 10B:
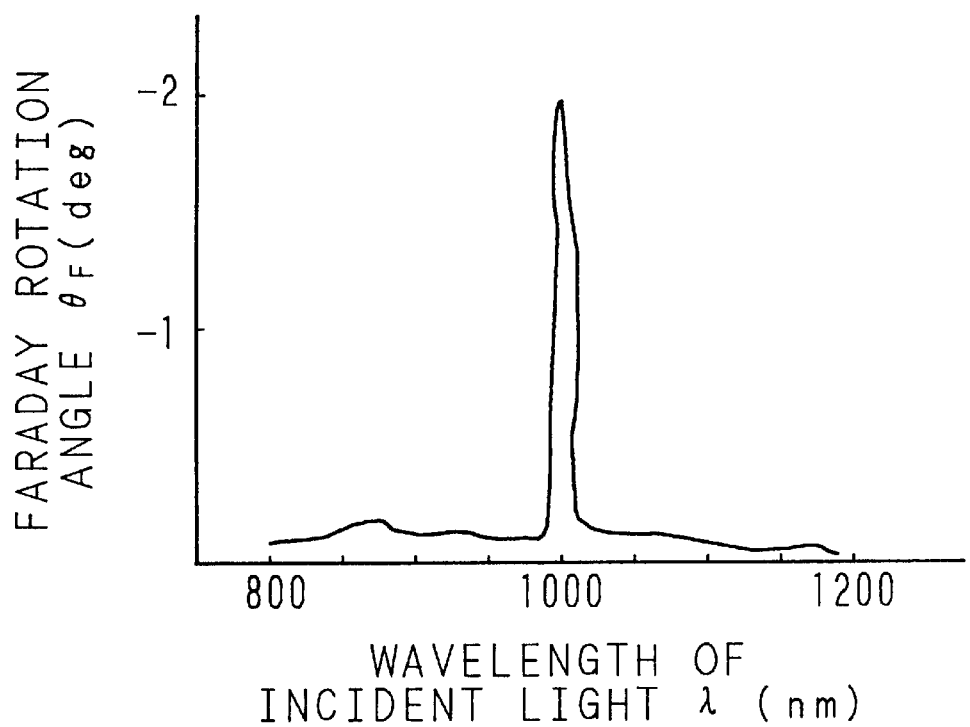

In the microcavity having the aforementioned structure, variation of the transmittance and the Faraday rotation angle $\theta_F$ in accordance with the wavelength of incident light are checked. The results are shown in FIGS. 10A and 10B, wherein the ordinates indicate the transmittance and the Faraday rotation angle $\theta_F$, and the abscissa indicates the wavelength λ of incident light. As is obvious from these graphs, the transmittance and the Faraday rotation angle $\theta_F$ exhibit their peaks in the vicinity of the wavelength λ of 1000 nm. In this manner, the microcavity including the dielectric substances having different refractive indexes as the reflection layer has high resonance Q (resonance level), and can attain a large magneto-optical effect.

Embodiment 3

The microcavity of the second embodiment resonates at the wavelength λ of 1000 nm, and in a third embodiment of the invention, a magneto-optical recording medium utilizing a multilayer resonance layer which resonates at a wavelength λ of 400 nm will be described. Although a semiconductor laser currently used in the magneto-optical recording has a wavelength of 680 nm, a semiconductor laser having a shorter wavelength is now being developed. The magneto-optical recording medium of the third embodiment is applicable to such a semiconductor laser having a shorter wavelength.

Figure 11:
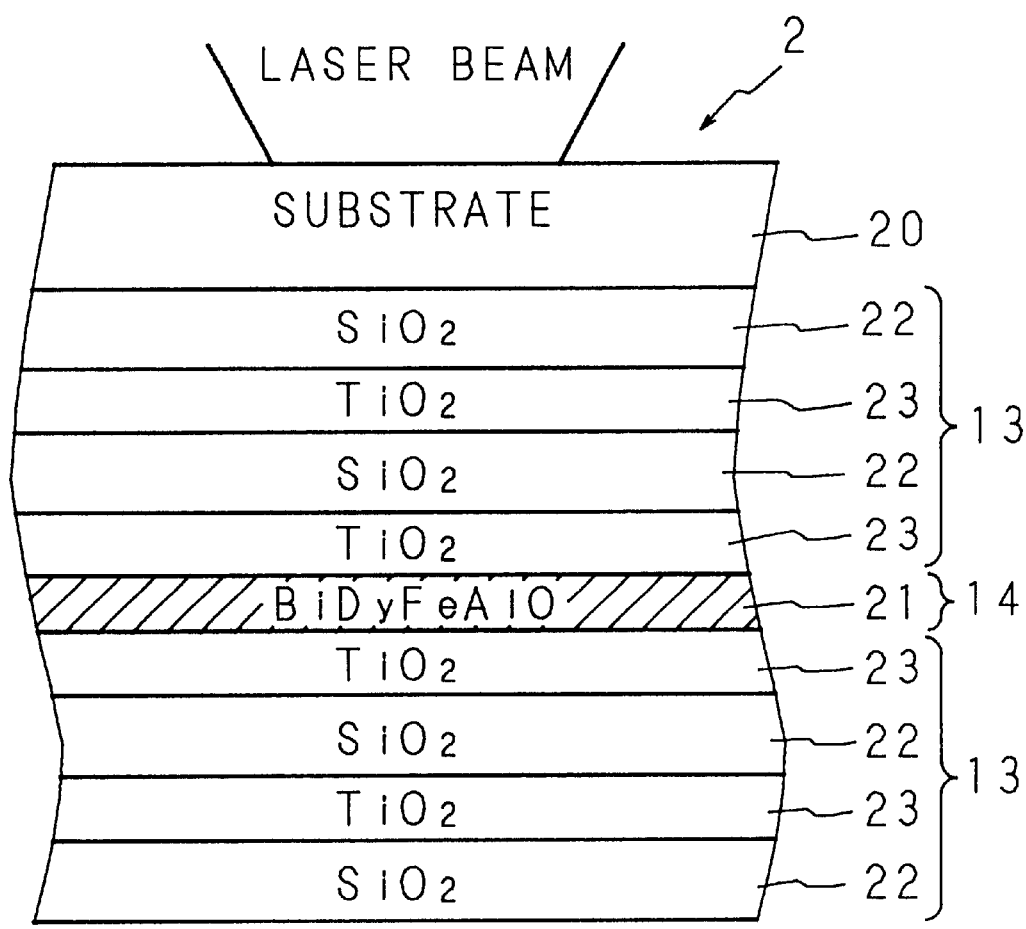
FIG. 11 is a sectional view for showing the layer structure of a magneto-optical recording medium according to a third embodiment.

FIG. 11 is a sectional view for showing the layer structure of this magneto-optical recording medium. As is shown in FIG. 11, the magneto-optical recording medium 2 includes a multilayer resonance device according to this invention provided on a substrate 20 of gadolinium-gallium-garnet. Specifically, on the substrate 20, a reflection layer 13, that is, a first regularly stacked layer, a magnetic layer 21 (corresponding to a center layer 14) of a BiDyFeAlO layer, and another reflection layer 13, that is, a second regularly stacked layer are stacked in this order. Each of the reflection layers 13 is a 4-layer stacked layer of a first dielectric layer 22 of $SiO_2$ and a second dielectric layer 23 of $TiO_2$, and these reflection layers 13 together have a layer structure symmetrical with respect to the center layer 14. In this case, the center layer 14 works as a recording layer where information is recorded. In FIG. 11, a magnetic substance is hatched. The structures and the forming methods of the respective layers in the magneto-optical recording medium 2 are listed in TABLE 2 below.

TABLE 2

The first dielectric layer 22 and the second dielectric layer 23 included in the reflection layer 13 of this magneto-optical recording medium 2 have thicknesses corresponding to [a wavelength λ of incident light/(4×refractive index M of the dielectric)] and are alternately stacked. Specifically, they are stacked with the thickness regularity. The $SiO_2$ layer has a thickness of 63 nm (=400/(4×1.6)), and the $TiO_2$ layer has a thickness of 37 nm (=400/4×2.7)). The center layer 14 of the BiDyFeAlO layer has a thickness disaccording with the thickness regularity of the reflection layer 13, and specifically has a thickness of 31 nm. The total thickness of the magneto-optical recording medium 2 is 431 nm. In this case, the wavelength λ of incident light is 400 nm, the refractive index M of the $SiO_2$ layer is 1.6 and the refractive index M of the $TiO_2$ layer is 2.7.

Figure 12A:
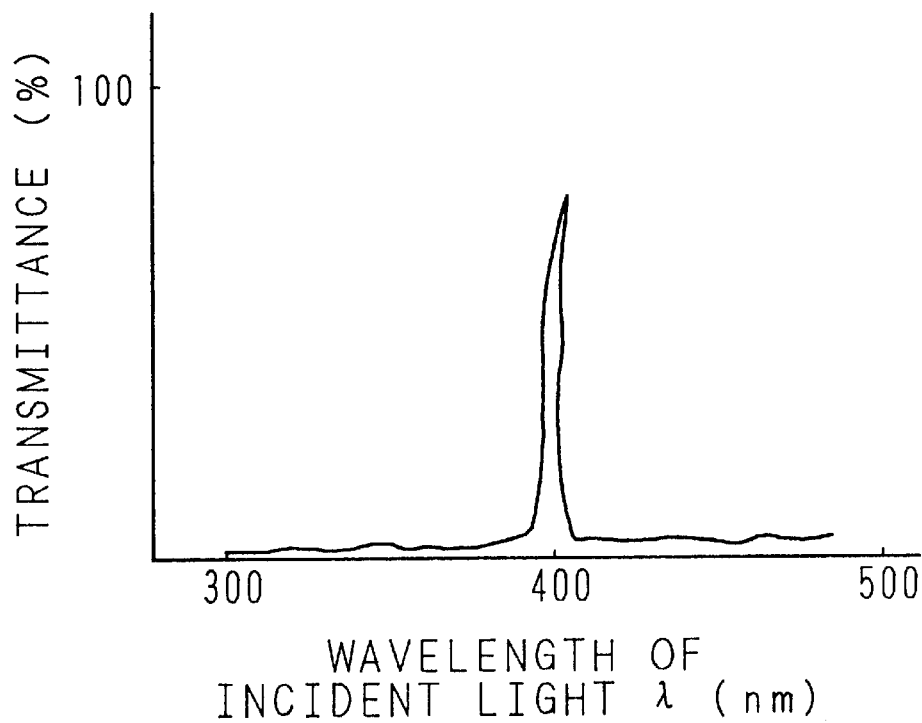
FIGS. 12A and 12B are graphs for showing a transmittance and a Faraday rotation angle against a wavelength of a laser beam in the magneto-optical recording medium of the third embodiment.
Figure 12B:
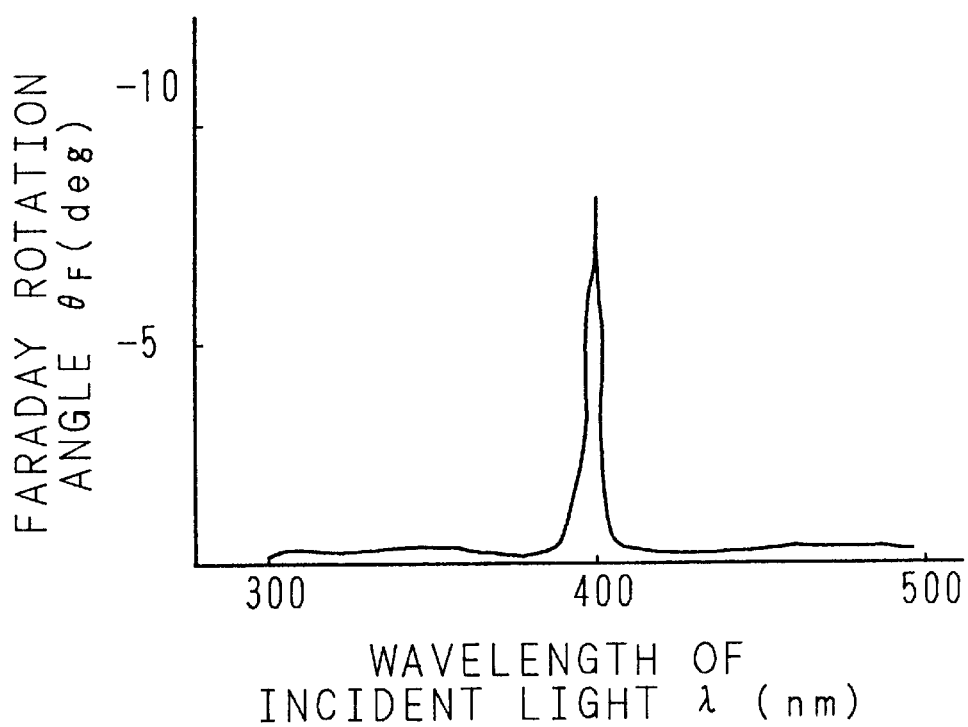

The magneto-optical recording medium 2 having the aforementioned structure is irradiated with a laser beam through the substrate 20 as is shown in FIG. 11, so as to check the variation of the transmittance and the Faraday rotation angle $\theta_F$ in accordance with the wavelength of the laser beam. The results are shown in graphs of FIGS. 12A and 12B. In FIGS. 12A and 12B, the ordinates indicate the transmittance and the Faraday rotation angle $\theta_F$, and the abscissa indicates the wavelength λ of the laser beam. As is obvious from these graphs, the transmittance and the Faraday rotation angle $\theta_F$ exhibit their peaks in the vicinity of the wavelength λ of 400 nm. In this manner, the magneto-optical recording medium using the center layer 14 of the multilayer resonance layer as a recording layer has very high resonance Q in a short wavelength region such as 400 nm and can attain a large magneto-optical effect.

Embodiment 4

In the third embodiment, the BiDyFeAlO layer is used as the center layer 14, but since such a garnet layer is polycrystal, a noise can be caused in a grain boundary. As a countermeasure, a magneto-optical recording medium using an amorphous material as the center layer 14 will now be described.

Figure 13:
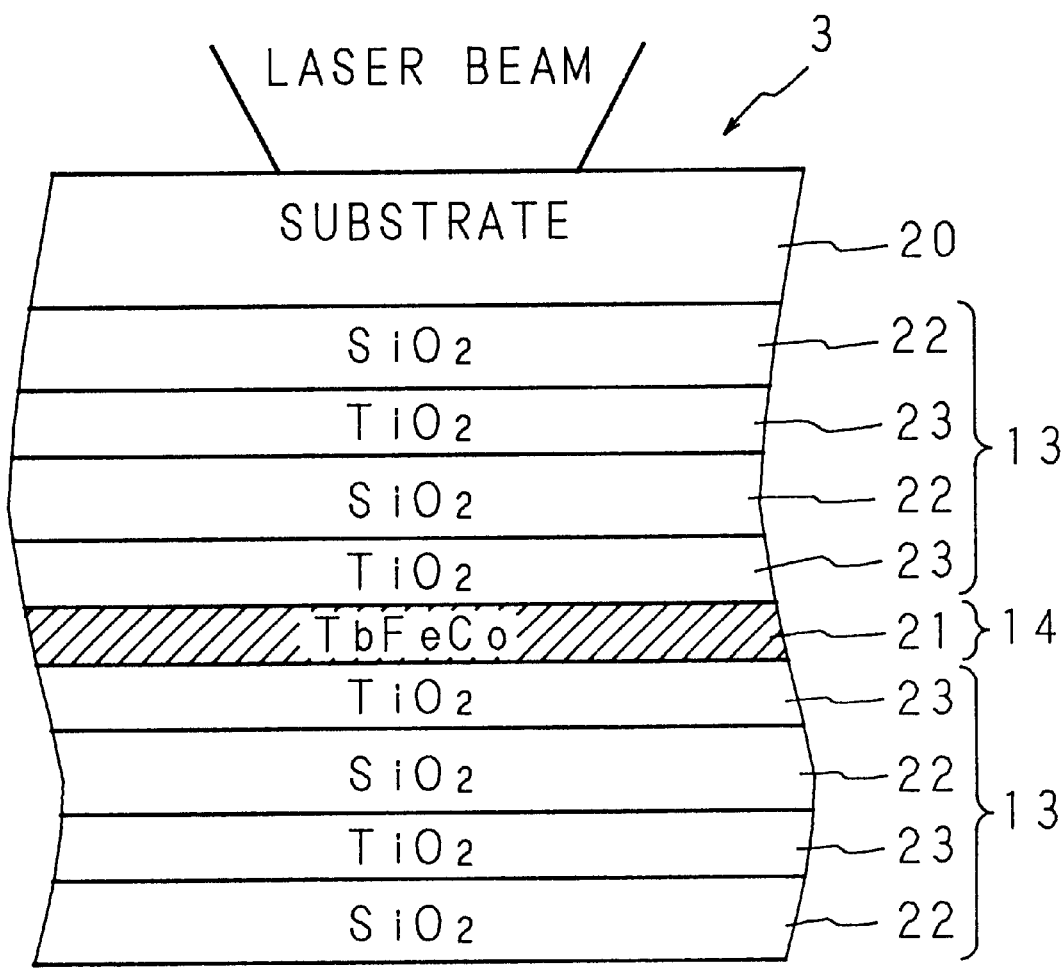
FIG. 13 is a sectional view for showing the layer structure of a magneto-optical recording medium according to a fourth embodiment.

FIG. 13 is a sectional view for showing the layer structure of this magneto-optical recording medium. As is shown in FIG. 13, the magneto-optical recording medium 3 includes a reflection layer 13 of a 4-layer stacked layer of a first dielectric layer 22 of $SiO_2$ and a second dielectric layer 23 of $TiO_2$, a magnetic layer 21 of a TbFeCo layer working as a center layer 14, and another reflection layer 13 of the 4-layer stacked layer of the second dielectric layer 23 of $TiO_2$ and the first dielectric layer 22 of $SiO_2$ stacked in this order on a substrate 20 of gadolinium-gallium-garnet. The center layer 14 works as a recording layer where information is recorded. The two reflection layers 13 together have a layer structure symmetrical with respect to the center layer 14. In FIG. 13, a magnetic substance is hatched. The structures and the forming methods of the respective layers of the magneto-optical recording medium 3 are listed in TABLE 3 below.

TABLE 3

The first dielectric layer 22 and the second dielectric layer 23 included in the reflection layer 13 of this magneto-optical recording medium 3 have thicknesses corresponding to [a wavelength λ of incident light/(4×refractive index M of the dielectric)], and are alternately stacked. Specifically, they are stacked with the thickness regularity. The $SiO_2$ layer has a thickness of 63 nm (=400/(4×1.6)), and the $TiO_2$ layer has a thickness of 37 nm (=400/(4×2.7)). The center layer 14 of the TbFeCo layer has a thickness disaccording with the thickness regularity of the reflection layer 13, and specifically have a thickness of 25 nm. The total thickness of the magneto-optical recording medium 3 is 425 nm. In this case, the wavelength λ of incident light is 400 nm, the refractive index M of the $SiO_2$ layer is 1.6 and the refractive index M of the $TiO_2$ layer is 2.7.

Figure 14A:
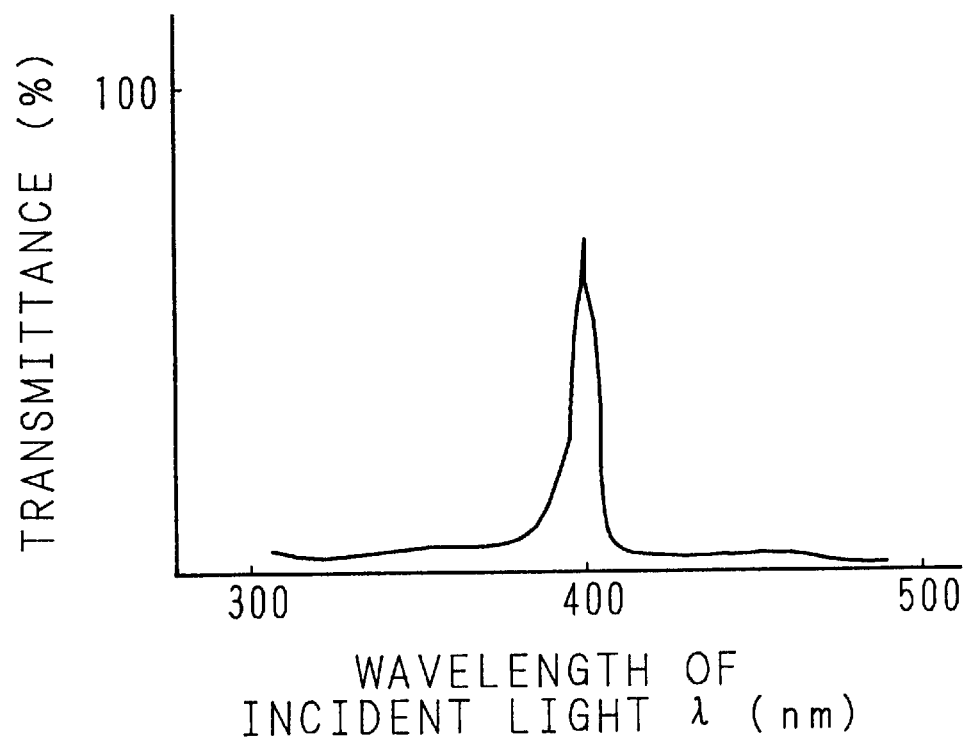
FIGS. 14A and 14B are graphs for showing a transmittance and a Faraday rotation angle against a wavelength of a laser beam in the magneto-optical recording medium of the fourth embodiment.
Figure 14B:
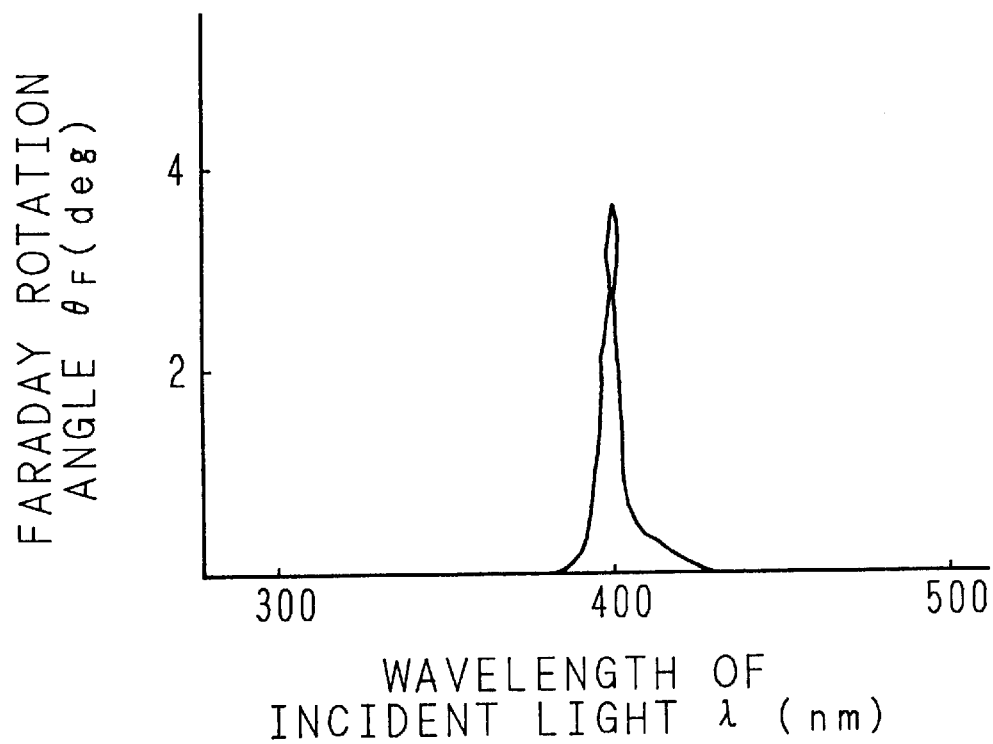

The magneto-optical recording medium 3 having the aforementioned structure is irradiated with a laser beam through the substrate 20 as is shown in FIG. 13, so as to check variation of the transmittance and the Faraday rotation angle $\theta_F$ in accordance with the wavelength of the laser beam. The results are shown in graphs of FIGS. 14A and 14B. In FIGS. 14A and 14B, the ordinates indicate the transmittance and the Faraday rotation angle $\theta_F$, and the abscissa indicates the wavelength λ of the laser beam. As is obvious from these graphs, the transmittance and the Faraday rotation angle $\theta_F$ exhibit their peaks in the vicinity of the wavelength λ of 400 nm. In this manner, the magneto-optical recording medium using the TbFeCo layer as the center layer 14 has very high resonance Q in the short wavelength region such as 400 nm, and can attain a large magneto-optical effect.

Embodiment 5

In the fourth embodiment, the magneto-optical recording medium having a high transmittance and a large Faraday rotation angle $\theta_F$ is described. However, since a general magneto-optical recording medium adopts a reflection structure, description will be given on a magneto-optical recording medium having the reflection structure in a fifth embodiment.

Figure 15:
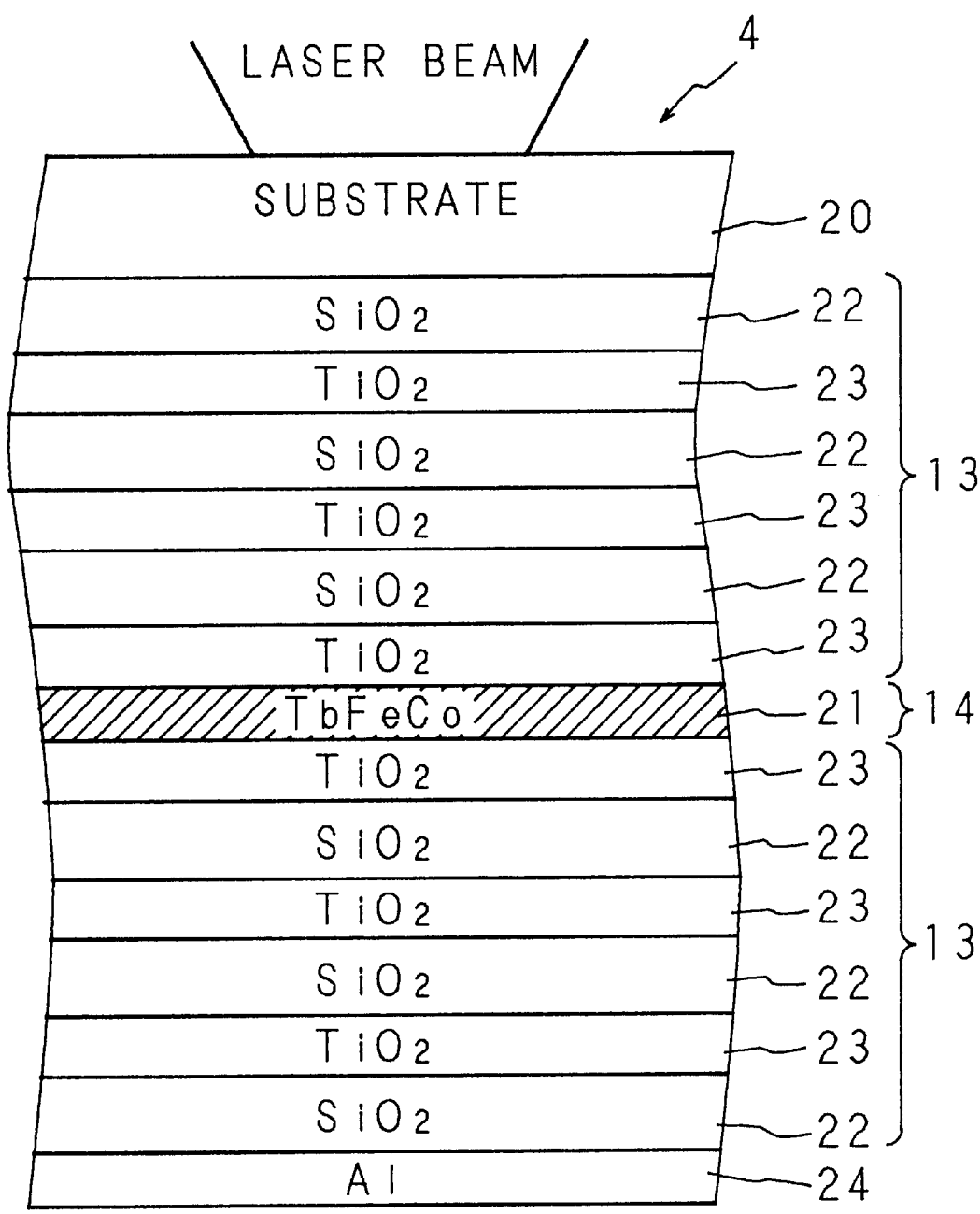
FIG. 15 is a sectional view for showing the layer structure of a magneto-optical recording medium according to a fifth embodiment.

FIG. 15 is a sectional view for showing the layer structure of this magneto-optical recording medium. As is shown in FIG. 15, the magneto-optical recording medium 4 includes a reflection layer 13 of a 6-layer stacked layer of a first dielectric layer 22 of $SiO_2$ and a second dielectric layer 23 of $TiO_2$, a magnetic layer 21 of a TbFeCo layer working as a center layer 14, another reflection layer 13 of the 6-layer stacked layer of the second dielectric layer 23 of $TiO_2$ and the first dielectric layer 22 of $SiO_2$, and an aluminum layer 24 stacked in this order on a substrate 20 of gadolinium-gallium-garnet. The center layer 14 works as a recording layer where information is recorded. The reflection layers 13 together have a layer structure symmetrical with respect to the center layer 14. In FIG. 15, a magnetic substance is hatched. The structures and the forming methods of the respective layers in the magneto-optical recording medium 4 are listed in TABLE 4 below:

TABLE 4

The first dielectric layer 22 and the second dielectric layer 23 included in the reflection layer 13 of this magneto-optical recording medium 4 have thicknesses corresponding to [a wavelength λ of incident light/(4×refractive index M of the dielectric)], and are alternately stacked. Specifically, they are stacked with the thickness regularity. The $SiO_2$ layer has a thickness of 63 nm (=400/(4×1.6)), and the $TiO_2$ layer has a thickness of 37 nm (=400/(4×2.7)). The center layer 14 of the TbFeCo layer has a thickness disaccording with the thickness regularity of the reflection layer 13, and specifically has a thickness of 25 nm. The total thickness of the magneto-optical recording medium 4 is 625 nm. In this case, the wavelength λ of incident light is 400 nm, the refractive index M of the $SiO_2$ layer is 1.6 and the refractive index M of the $TiO_2$ layer is 2.7.

Figure 16A:
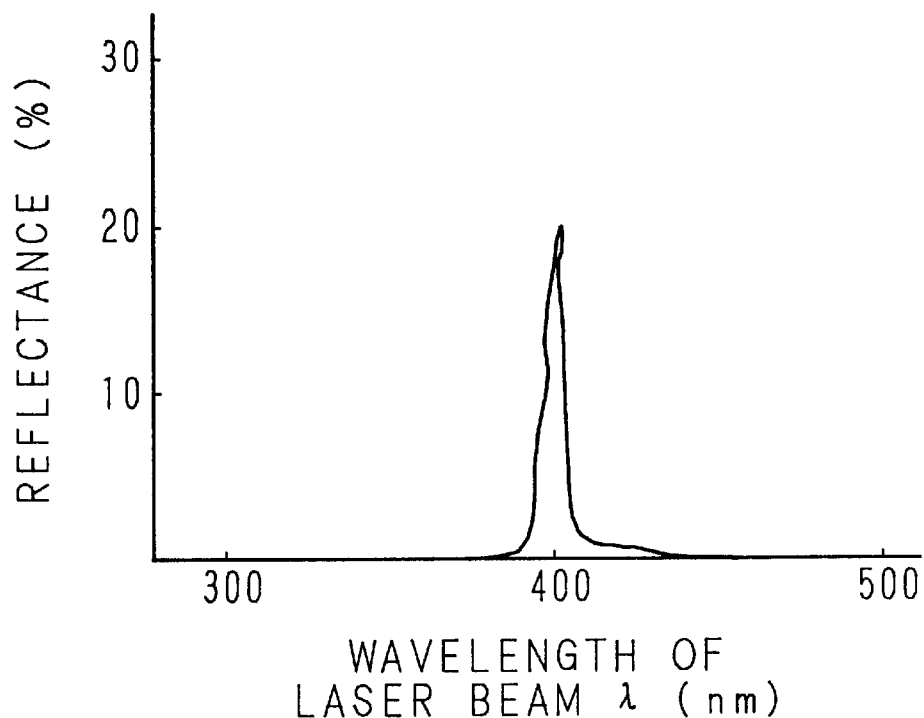
FIGS. 16A and 16B are graphs for showing a reflectance and a Kerr rotation angle against a wavelength of a laser beam in the magneto-optical recording medium of the fifth embodiment.
Figure 16B:
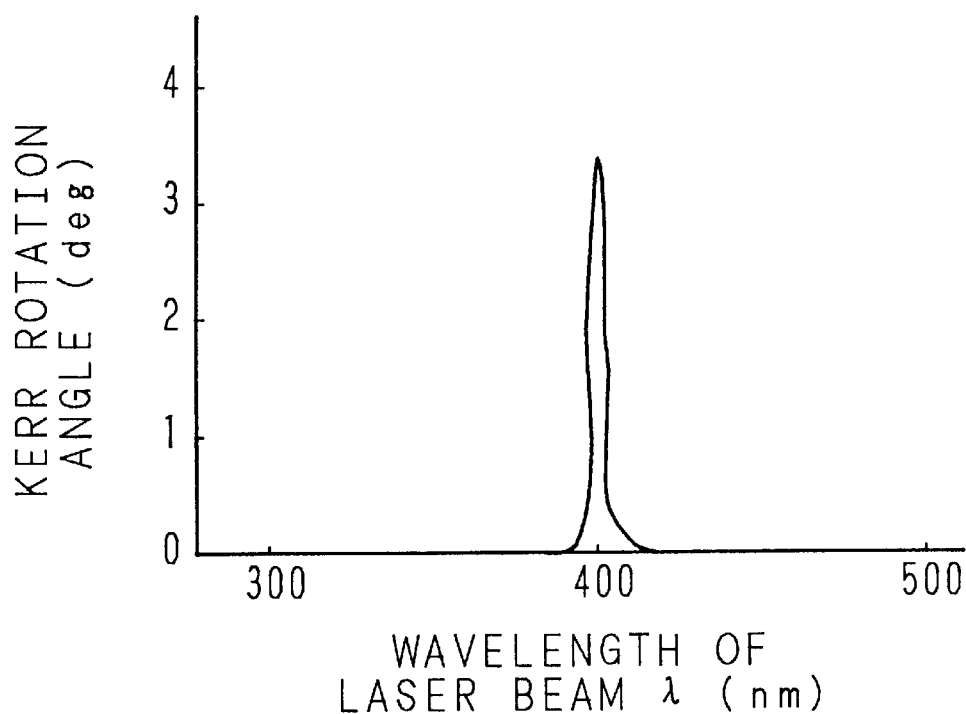

The magneto-optical recording medium 4 having the aforementioned structure is irradiated with a laser beam through the substrate 20 as is shown in FIG. 15, so as to check variation of the reflectance and the Kerr rotation angle in accordance with the wavelength of the laser beam. The results are shown in graphs of FIGS. 16A and 16B. In FIGS. 16A and 16B, the ordinates indicate the reflectance and the Kerr rotation angle, and the abscissa indicates the wavelength λ of the laser beam. As is obvious from these graphs, the reflectance and the Kerr rotation angle exhibit their peaks in the vicinity of the wavelength λ of 400 nm. Thus, this magneto-optical recording medium can attain an appropriate reflectance and a large Kerr rotation angle.

Figure 17:
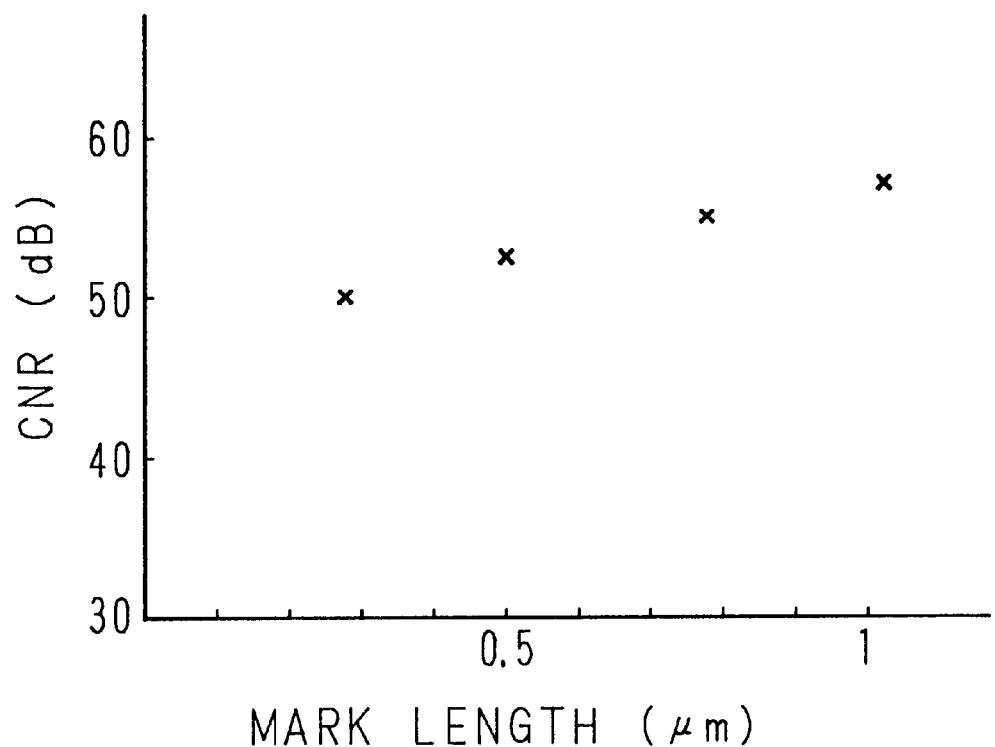
FIG. 17 is a graph for showing a CNR against a mark length in the magneto-optical recording medium of the fifth embodiment.

Next, this magneto-optical recording medium 4 is checked for its recording/reproducing characteristic. As the substrate 20, a land substrate with a track pitch of 1 μm is used. In a recording/reproducing operation, argon laser with a wavelength of 409 nm is used, so as to measure a CNR against a length of a mark recorded in the magneto-optical recording medium 4. At this point, reproducing laser power is set at a very small value of 0.2 mW so as not to largely change the temperature in a beam spot in the reproducing operation. The result is shown in a graph of FIG. 17, wherein the abscissa indicates the mark length and the ordinate indicates the CNR. As is obvious from this graph, a CNR of 50 dB or more can be obtained even when the mark length is small. Thus, the magneto-optical recording medium 4 has a good recording/reproducing characteristic.

In this manner, the magneto-optical recording medium of the fifth embodiment having the reflection structure using the multilayer resonance layer has very high resonance Q in the short wavelength region such as 400 nm, and can attain a large magneto-optical effect.

In the fourth and fifth embodiments, TbFeCo is used as the magnetic layer 21, but a rare earth—transition metal magnetic substance, such as DyFeCo, can be used as the magnetic layer 21.

Embodiment 6

In a sixth embodiment, description will be given on a magneto-optical recording medium capable of super resolution reproduction by utilizing a characteristic of the multilayer resonance layer of this invention of having different resonance wavelengths in accordance with a temperature. Since the multilayer resonance layer including a center layer working as a recording layer is a resonator, its resonance wavelength is varied in accordance with a temperature. Accordingly, when a magneto-optical recording medium can exhibit a large magneto-optical effect at a given temperature alone, a recording mark with a dimension smaller than a laser spot diameter can be reproduced, resulting in attaining high density recording.

Figure 18:
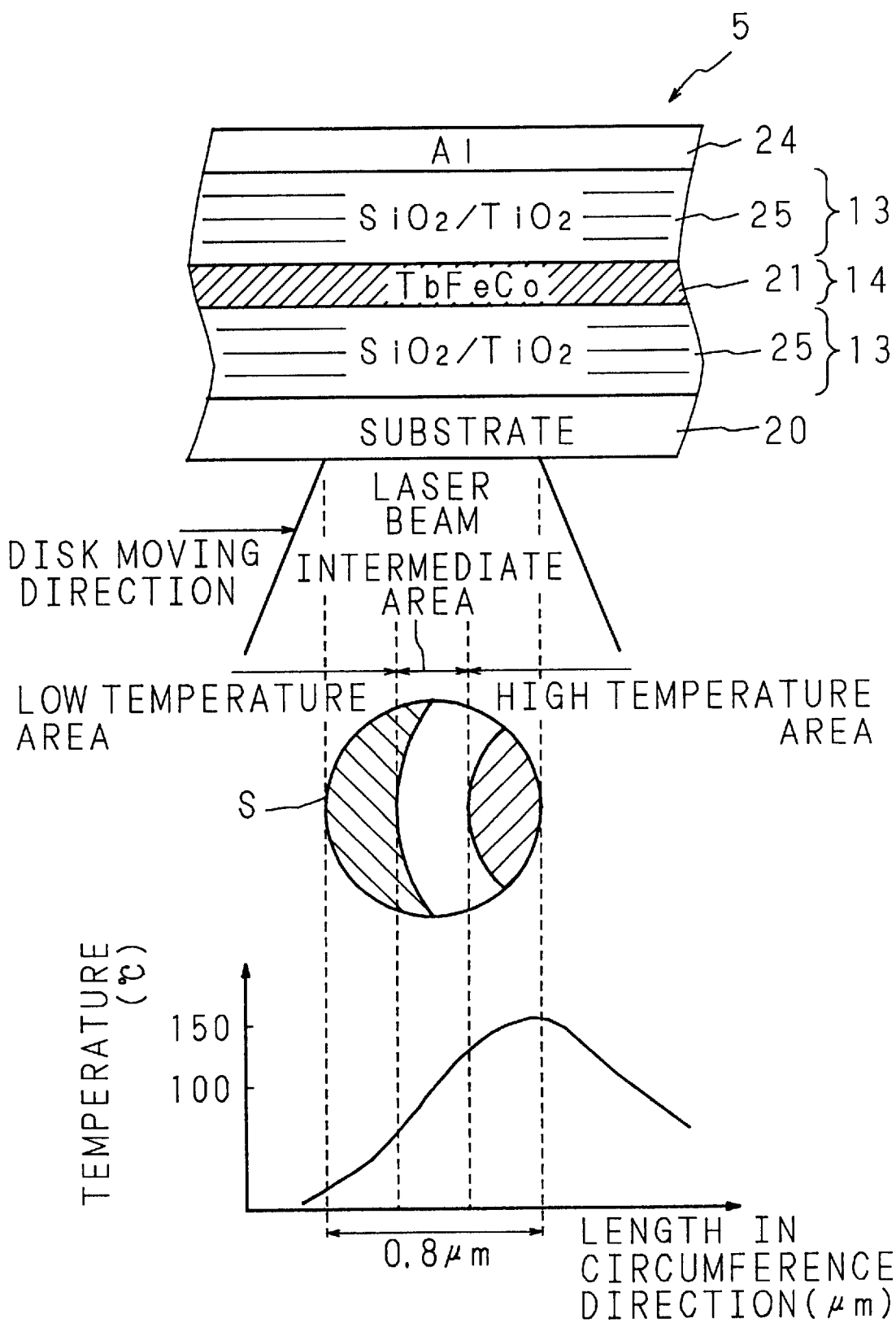
FIG. 18 is a diagram for showing the layer structure and a temperature distribution in a reproducing operation of a magneto-optical recording medium according to a sixth embodiment.

FIG. 18 is a diagram for showing the layer structure of the magneto-optical recording medium and a temperature distribution in a laser spot S. As is shown in FIG. 18, the magneto-optical recording medium 5 includes a reflection layer 13 of a 6-layer stacked layer of a $SiO_2$ layer and a $TiO_2$ layer, a TbFeCo layer working as a center layer 14, another reflection layer 13 of the 6-layer stacked layer of the $TiO_2$ layer and the $SiO_2$ layer, and an aluminum layer 24 stacked in this order on a substrate 20 of gadolinium-gallium-garnet. The center layer 14 works as a recording layer where information is recorded. The reflection layers 13 together have a layer structure symmetrical with respect to the center layer 14. In the structure shown in FIG. 18, a magnetic substance is hatched. The structures and the forming methods of the respective layers of the magneto-optical recording medium 5 are listed in TABLE 5 below.

TABLE 5

The $SiO_2$ layer and the $TiO_2$ layer included in the reflection layer 13 of this magneto-optical recording medium 5 have thicknesses corresponding to [a wavelength λ of incident light/(4×refractive index M of the dielectric)], and are alternately stacked. Specifically, they are stacked with the thickness regularity. The $SiO_2$ layer has a thickness of 65 nm, and the $TiO_2$ layer has a thickness of 40 nm. The center layer 14 of the TbFeCo layer has a thickness disaccording with the thickness regularity of the reflection layer 13, and specifically has a thickness of 27 nm. The total thickness of the magneto-optical recording medium 5 is 657 nm. In this case, the wavelength λ of incident light is 400 nm.

Figure 19A:
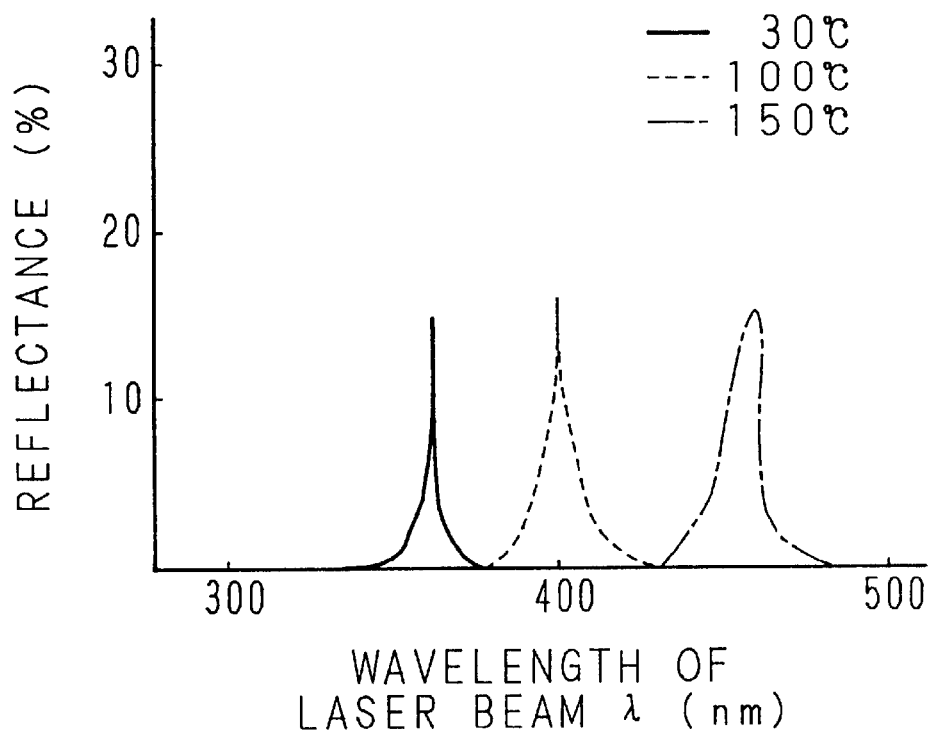
FIGS. 19A and 19B are graphs for showing a reflectance and a Kerr rotation angle against a wavelength of a laser beam in the magneto-optical recording medium of the sixth embodiment.
Figure 19B:
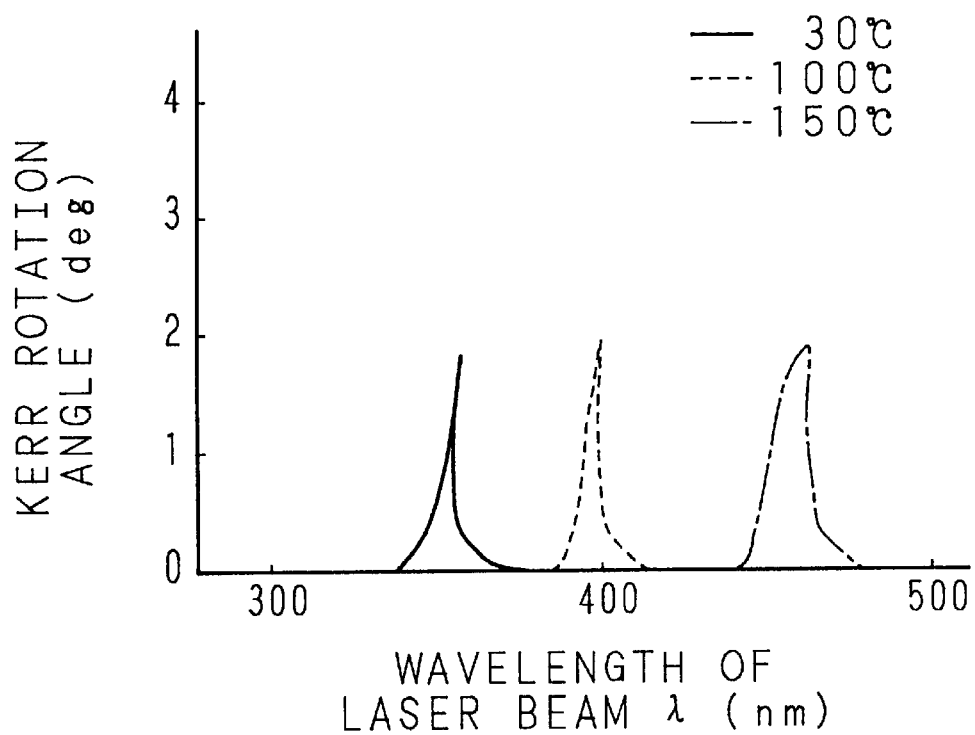

In the magneto-optical recording medium 5 having the aforementioned structure, variation of the reflectance and the Kerr rotation angle in accordance with a temperature is checked. The results are shown in graphs of FIGS. 19A and 19B, wherein the ordinates indicate the reflectance and the Kerr rotation angle, and the abscissa indicates the wavelength λ of a laser beam. In these graphs, a solid line indicates a result obtained at a temperature of 30° C., a broken line indicates a result obtained at a temperature of 100° C., and a dashed line indicates a result obtained at a temperature of 150° C. As is obvious from these graphs, the reflectance and the Kerr rotation angle exhibit their peaks in the vicinity of the wavelength λ of 350 nm at a temperature of 30° C., in the vicinity of the wavelength λ of 400 nm at a temperature of 100° C., and in the vicinity of the wavelength λ of 450 nm at a temperature of 150° C. In this manner, the magneto-optical recording medium 5 attains a large magneto-optical effect at given temperatures alone.

Now, the super resolution reproduction of the magneto-optical recording medium 5 utilizing the characteristic of the resonance wavelength varied in accordance with a temperature will be described. In a reproducing operation, the magneto-optical recording medium 5 is irradiated with a laser beam through the substrate 20. At this point, the magneto-optical recording medium 5 is moved relatively to the laser beam, resulting in causing a temperature distribution in a portion irradiated with the laser beam. As is shown in FIG. 18, a high temperature area and a low temperature area are formed in front and back portions in a moving direction of a laser spot S, and an intermediate temperature area is formed around the center of the laser spot S. The temperatures in the low temperature areas the intermediate temperature area and the high temperature area are approximately 30° C., 100° C. and 150° C., respectively. In this case, when the wavelength λ of the irradiating laser beam is 450 nm, a recording mark formed in the intermediate temperature area is reproduced, and when the wavelength λ is 350 nm or 450 nm, a recording mark formed in the low temperature area or the high temperature area is reproduced. In other words, a recording mark smaller than the diameter of a laser spot can be read from a predetermined area of the spot in accordance with the wavelength λ of the used laser beam.

Figure 20:
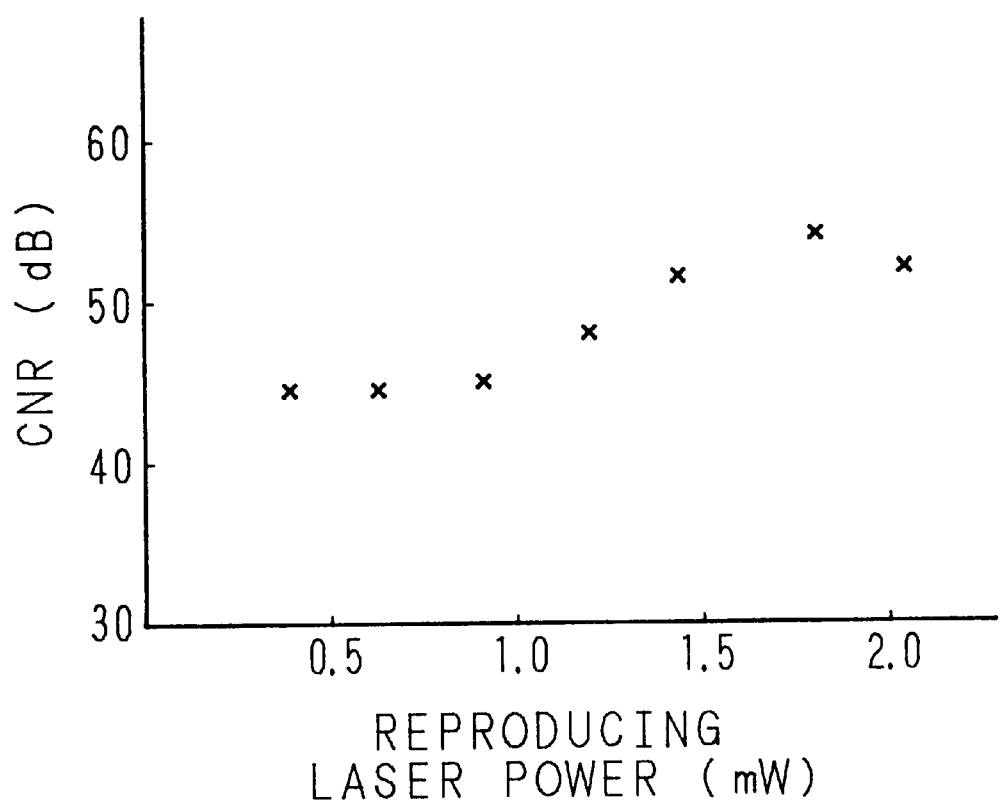
FIG. 20 is a graph for showing a CNR against reproducing laser power in the magneto-optical recording medium of the sixth embodiment.

A recording mark with a length of 0.5 μm is formed in the magneto-optical recording medium 5, so as to measure a CNR with reproducing laser power varied. The used laser beam has a wavelength of 409 nm. The result is shown in a graph of FIG. 20, wherein the abscissa indicates the reproducing laser power and the ordinate indicates the CNR. As is understood from this graph, a CNR of 50 dB or more can be attained when the reproducing laser power is 1.5 mW or more.

Figure 21:
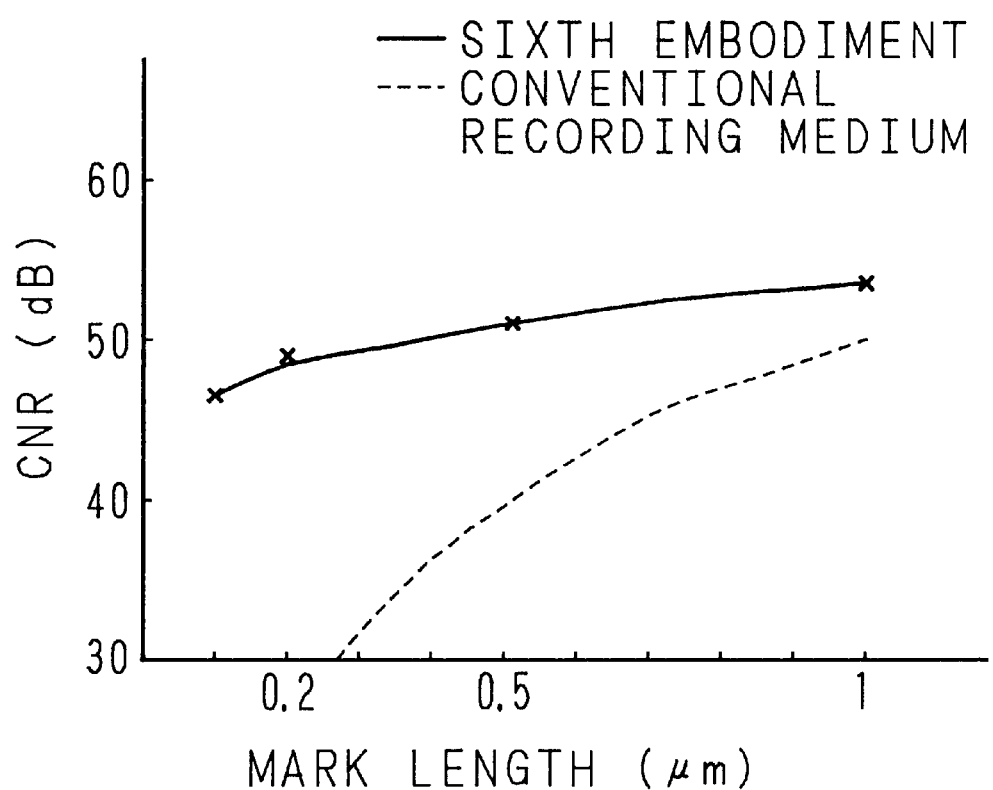
FIG. 21 is a graph for showing a CNR against a mark length in the magneto-optical recording medium of the sixth embodiment.

Next, the CNR is measured with reproducing laser power kept constant and the length of a recording mark varied. For comparison, a CNR is similarly measured in a conventional magneto-optical recording medium having a reflection structure of SiN/TbFeCo/SiN/Al. The results are shown in a graph of FIG. 21, wherein the abscissa indicates the mark length and the ordinate indicates the CNR. In this graph, the result obtained by the recording medium of the sixth embodiment is shown with a solid line and that obtained by the conventional recording medium is shown with a broken line. As is understood from the graph, the recording medium of the sixth embodiment has a large CNR even when the mark length is small, specifically, a CNR of 48 dB or more can be attained when the mark length is 0.2 μm. In contrast, in the conventional magneto-optical recording medium, a reproducing output cannot be obtained when the mark length is 0.2 μm.

In this manner, the magneto-optical recording medium of the sixth embodiment having the reflection structure including the multilayer resonance layer can attain the same effect as that of the fifth embodiment. In addition, since a specific wavelength of the reproducing laser beam can be resonated in accordance with a temperature of the medium, a recording mark formed merely in a given area in the laser spot can be reproduced. Thus, the super resolution reproduction can be conducted, resulting in realizing high density recording of information.

Embodiment 7

A magneto-optical recording medium using the multilayer resonance layer of the first embodiment will now be described.

Figure 22:
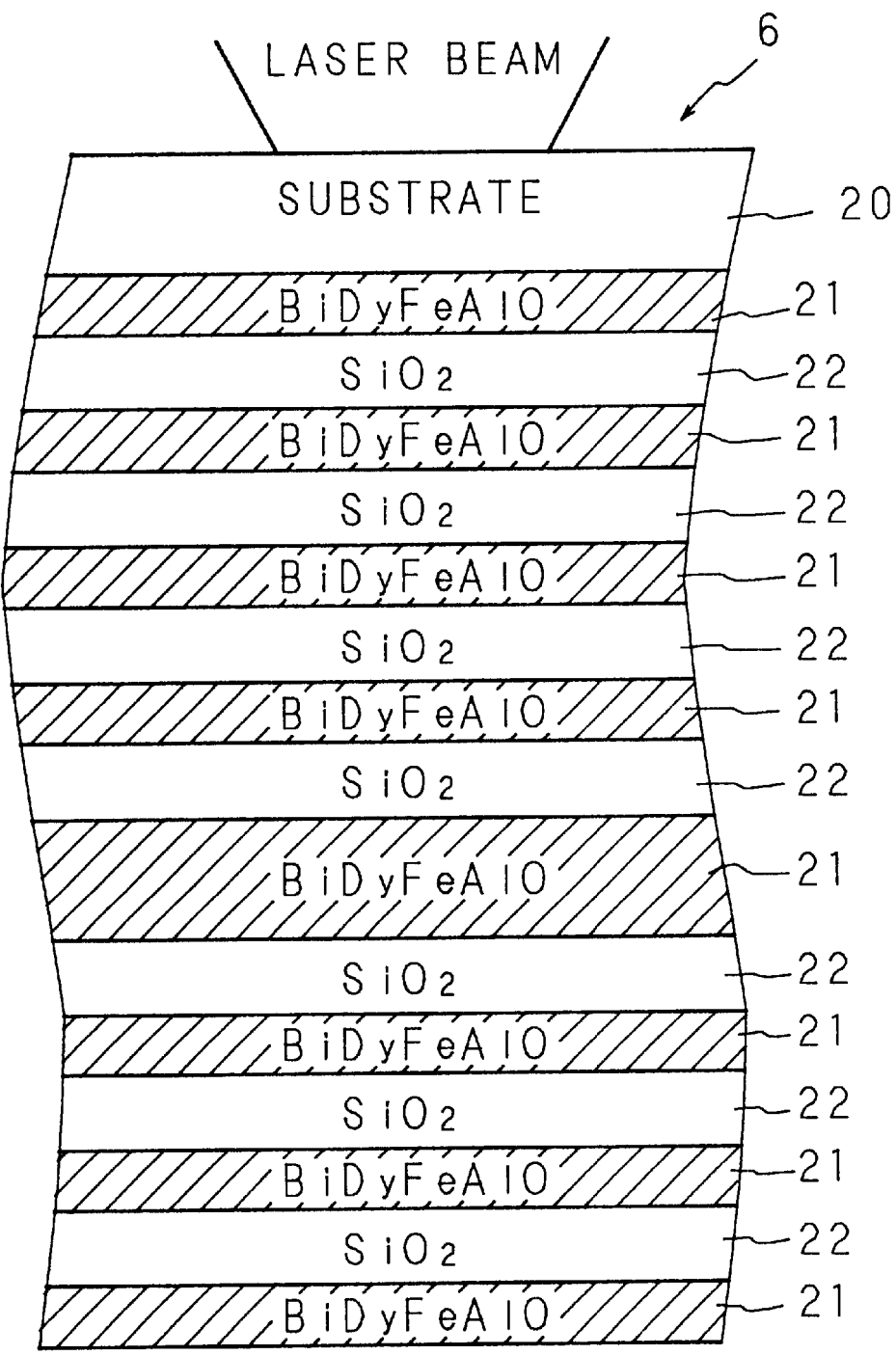
FIG. 22 is a sectional view for showing the layer structure of a magneto-optical recording medium according to a seventh embodiment.

FIG. 22 is a sectional view for showing the layer structure of this magneto-optical recording medium. As is shown in FIG. 22, the magneto-optical recording medium 6 includes the multilayer resonance device of the invention disposed on a substrate 20 of gadolinium-gallium-garnet. Specifically, on the substrate 20, a magnetic layer 21 of a BiDyFeAlO layer, that is, a first optical layer, and a dielectric layer 22 of a $SiO_2$ layer, that is, a second optical layer, are alternately stacked with a magnetic layer 21 of a BiDyFeAlO layer disposed at substantially the center thereof. The center magnetic layer 21 has a thickness of 500 nm. Each of the dielectric layers 22 and the magnetic layers 21 included in stacked layers at both sides of the center magnetic layer 21 have thicknesses of 320 nm and 250 nm, respectively. The total thickness is 4490 nm. In this case, the center magnetic layer 21 works as a recording layer where information is recorded. In FIG. 22, magnetic substances are hatched. The structures and the forming methods of the respective layers of the magneto-optical recording medium 6 are listed in TABLE 6 below:

TABLE 6

The magneto-optical recording medium 6 having the aforementioned structure is irradiated with a laser beam through the substrate 20 as is shown in FIG. 22, so as to check variation of the transmittance and the Faraday rotation angle $\theta_F$ in accordance with the wavelength of the laser beam. As a result, similar results to those obtained in the third embodiment are obtained. Specifically, the transmittance and the Faraday rotation angle $\theta_F$ exhibit their peaks in the vicinity of the wavelength λ of 400 nm. The magneto-optical recording medium having such a layer structure has high resonance Q in the short wavelength region such as 400 nm, and can attain a large magneto-optical effect.

In the aforementioned magneto-optical recording medium, the resonance wavelength can be varied depending upon a temperature. Therefore, multiple recording/reproducing can be conducted by recording information in plural magnetic layers working as recording layers and by reproducing the information at a varied reproducing temperature. Also, since the resonance wavelength can be varied in accordance with a layer structure, the multiple recording/reproducing can be conducted by changing the wavelength of a used laser beam.

As described above, the multilayer resonance device of this invention includes regularly stacked layers each formed by alternately stacking a magnetic substance and a dielectric substance with thickness regularity and a magnetic substance having a thickness disaccording to the thickness regularity disposed substantially at the center to be sandwiched between the regularly stacked layers. Therefore, the multilayer resonance device can attain a large magneto-optical effect through resonance of incident light, and also can attain a practical thickness. Furthermore, since the number of stacked layers is small, the manufacture can be eased. Moreover, the magneto-optical recording medium of this invention includes this multilayer resonance device disposed on a substrate, so that information can be recorded in the magnetic substance disposed substantially at the center. Therefore, the magneto-optical recording medium can attain a large magneto-optical effect even in a short wavelength region of an irradiating beam, and also can realize the super resolution reproduction because the resonance wavelength is varied in accordance with a temperature. Furthermore, a large magneto-optical effect can be attained even when a magneto-optical recording/reproducing operation is conducted by using the near-field optics.

Embodiment 8

In the fourth embodiment described above, $SiO_2$ and $TiO_2$ are used in the regularly stacked layers 13. In a magneto-optical recording medium of this embodiment, SiN is used instead of $TiO_2$.

Figure 23:
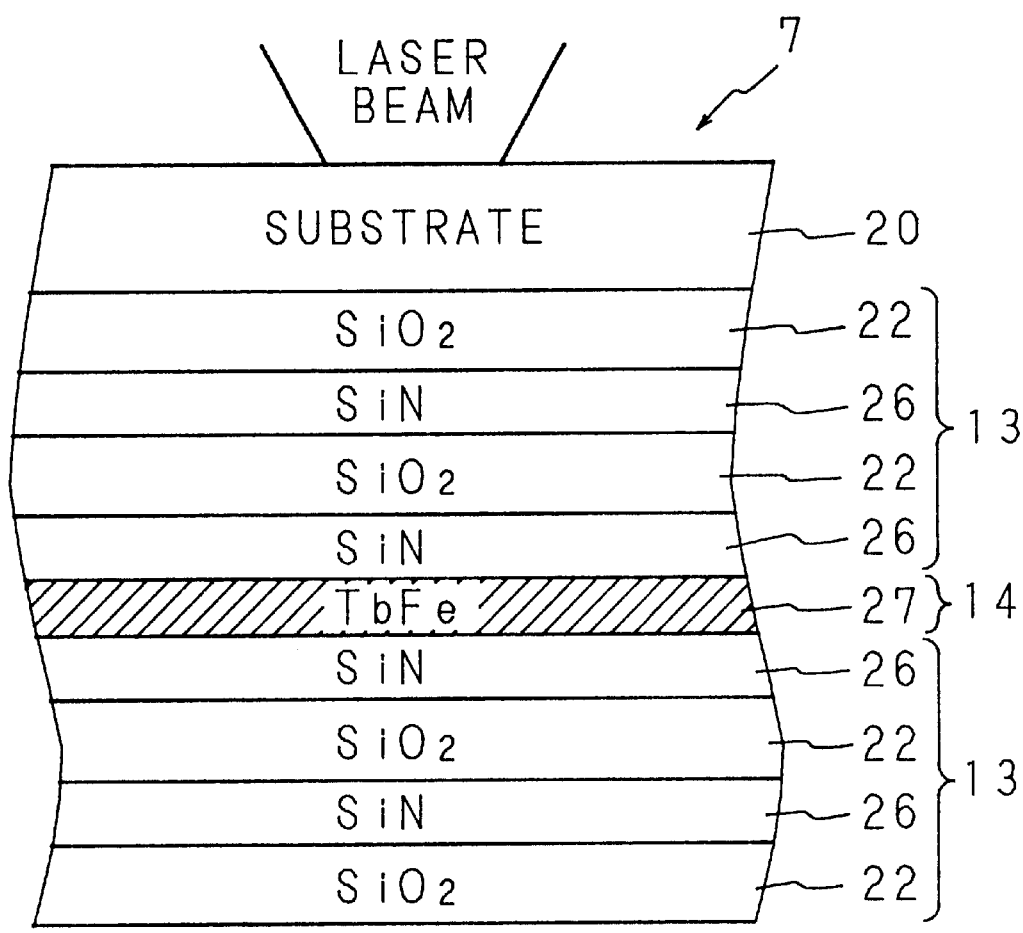
FIG. 23 is a sectional view for showing the layer structure of a magneto-optical recording medium according to an eighth embodiment.

FIG. 23 is a sectional view for showing the layer structure of this magneto-optical recording medium. As is shown in FIG. 23, the magneto-optical recording medium 7 includes a reflection layer 13 of a 4-film stacked layer consisting of a first dielectric layer 22 of $SiO_2$ and a second dielectric layer 26 of SiN, a magnetic layer 27 of TbFe working as a center layer 14, and another reflection layer 13 of the 4-film stacked layer consisting of the second dielectric layer 26 of SiN and the first dielectric layer 22 of $SiO_2$ stacked in this order on a substrate 20 of gadolinium-gallium-garnet. The center layer 14 works as a recording layer where information is recorded. The two reflection layers 13 together have a layer structure symmetrical with respect to the center layer 14. When the number of pairs each including two dielectric layers (i.e., $SiO_2$/SiN) in the reflection layer 13 is indicated as Np, each of the two reflection layers 13 of this embodiment has Np of 2. In FIG. 23, a magnetic substance is hatched. The structures and the forming methods of the respective layers of the magneto-optical recording medium 7 are listed in TABLE 7 below. It is noted that SiN has a refractive index substantially the same as that of $TiO_2$ and exhibits a superior protecting effect.

TABLE 7

The first dielectric layer 22 and the second dielectric layer 26 included in the reflection layer 13 of this magneto-optical recording medium 7 have thicknesses corresponding to [a wavelength λ of incident light/(4×refractive index M of the dielectric], and are alternately stacked. Specifically, they are stacked with the thickness regularity. Specifically, the $SiO_2$ layer has a thickness of 106 nm (=680/(4×1.6)), and the SiN layer has a thickness of 63 nm (=680/(4×2.7)). The center layer 14 consisting of the TbFe layer 27 has a thickness disaccording with the thickness regularity of the reflection layers 13, and specifically has a thickness of 40 nm. The total thickness of the magneto-optical recording medium 7 is 716 nm. In this case, the wavelength λ of incident light is 680 nm, the refractive index M of the $SiO_2$ layer is 1.6 and the refractive index M of the SiN layer is 2.7.

Figure 24:
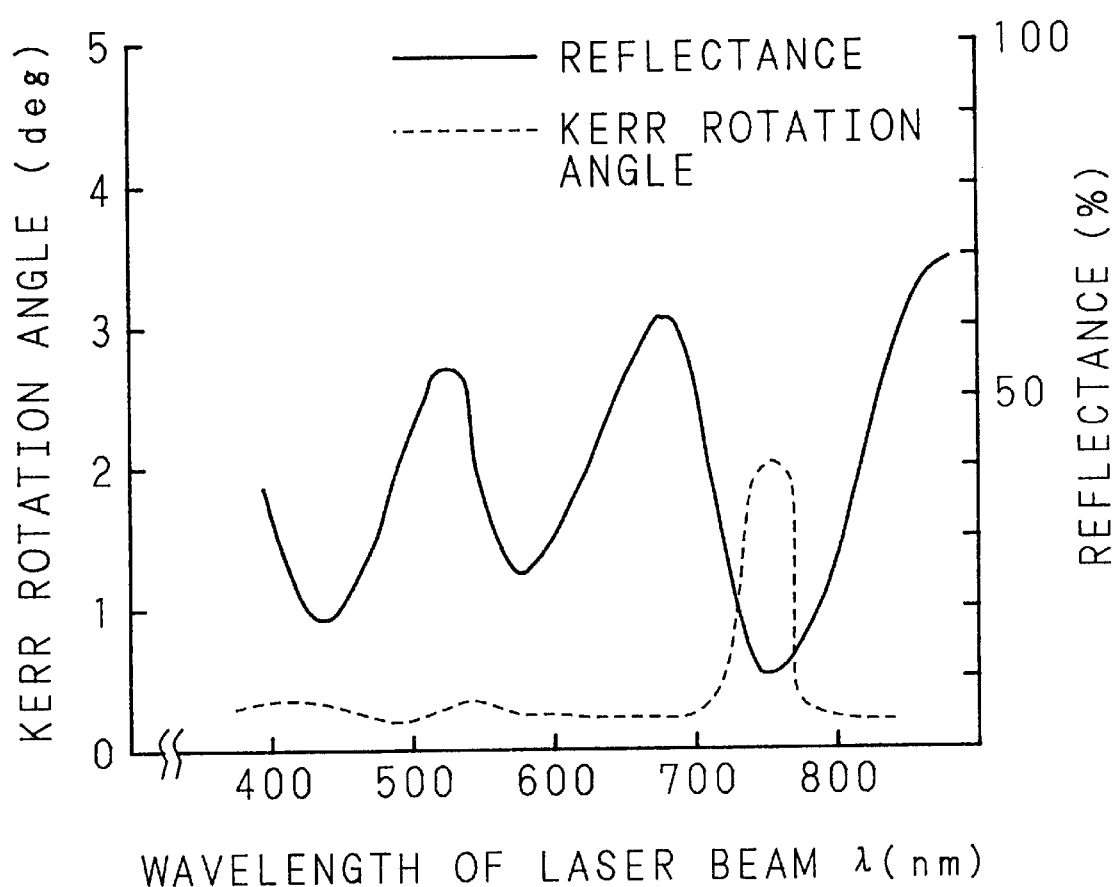
FIG. 24 is a graph for showing dependency of a Kerr rotation angle and a reflectance on a wavelength of a laser beam in the magneto-optical recording medium of FIG. 23.

The magneto-optical recording medium 7 having the aforementioned structure is irradiated with a laser beam through the substrate 20 as is shown in FIG. 23, so as to check dependency, on the wavelength of the laser beam, of the Kerr rotation angle and the reflectance of this medium. The results are shown in a graph of FIG. 24. In FIG. 24, the ordinate indicates the Kerr rotation angle and the reflectance, and the abscissa indicates the wavelength λ of the laser beam. As is obvious from FIG. 24, when the wavelength λ is approximately 750 nm, the reflectance is decreased to approximately 10% but the Kerr rotation angle is approximately 2 degrees. This value of the Kerr rotation angle is larger than the original Kerr rotation angle value of the TbFe layer 27, that is, 0.3 degree. In this manner, it is confirmed that the magneto-optical recording medium 7 using SiN as the second dielectric layer 26 can attain a large magneto-optical effect.

Embodiment 9

Figure 25:
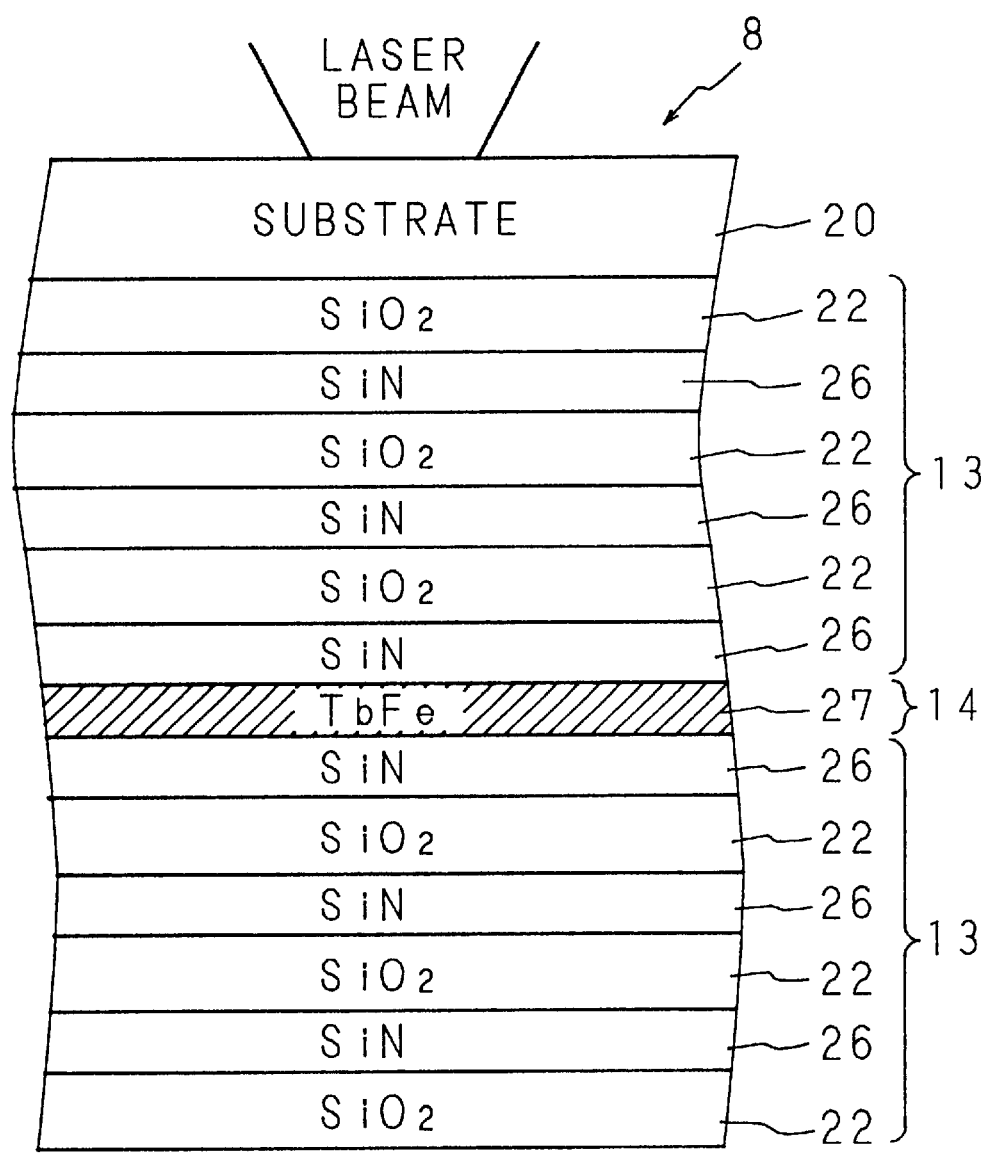
FIG. 25 is a sectional view for showing the layer structure of a magneto-optical recording medium according to a ninth embodiment.

Next, a magneto-optical recording medium including a reflection layer 13 with Np of $SiO_2$/SiN of 3 is manufactured, so as to check the Kerr rotation angle and the reflectance. FIG. 25 is a sectional view for showing the layer structure of this magneto-optical recording medium. As is shown in FIG. 25, the magneto-optical recording medium 8 includes a reflection layer 13 including three pairs of $SiO_2$ and SiN, a center layer 14 of a TbFe layer and another reflection layer 13 including three pairs of SiN and $SiO_2$ stacked in this order on a substrate 20. The thicknesses and the forming conditions for the TbFe layer, the $SiO_2$ layer and the SiN layer are the same as those listed in TABLE 7, and the description is omitted.

The magneto-optical recording medium 8 is irradiated with a laser beam, so as to check the dependency, on the wavelength of the laser beam, of the Kerr rotation angle and the reflectance. As a result, it is found that the Kerr rotation angle is as large as 10 degrees, while the reflectance is approximately 5%, at the wavelength λ of the laser beam of 750 nm. In considering that the Kerr rotation angle is 2 degrees at the wavelength of 750 nm in the magneto-optical recording medium 7 of the eighth embodiment (see FIG. 23), in order to attain a large Kerr rotation angle, it is effective that the reflection layer 13 has Np, that is, the number of pairs of the dielectric layers, of 3 or more.

Next, the magneto-optical recording medium 8 of FIG. 25 is checked for its corrosion resistance. For comparison, a comparative example 1, in which $TiO_2$ is used instead of SiN as the second dielectric layer 26, namely, having a layer structure of a substrate/$SiO_2$/$TiO_2$/$SiO_2$/$TiO_2$/$SiO_2$/$TiO_2$/FeCo/$TiO_2$/$SiO_2$/$TiO_2$/$SiO_2$/$TiO_2$/$SiO_2$ stacked in this order from the incident face of a laser beam, is manufactured. The comparative example 1 is completely identical to the magneto-optical recording medium 8 except for $TiO_2$, and hence is not described in detail.

The magneto-optical recording medium 8 and the comparative example 1 are subjected to an anticorrosion test in a thermo-hygrostat at a temperature of 80° C. and a relative humidity of 85% for 100 hours. As a result, the Kerr rotation angle of the magneto-optical recording medium 8 of this embodiment is not changed but remains to be 10 degrees. In contrast, the Kerr rotation angle of the comparative example 1 is decreased to 5 degrees after the acceleration test, which is smaller by approximately 50% than that attained before the test. This seems to be because the FeCo layer, that is, rare earth transition metal amorphous, is affected by oxidation. In view of the result of this test, the magneto-optical recording medium 8 of this embodiment is found to be superior in the corrosion resistance.

Embodiment 10

Figure 26:
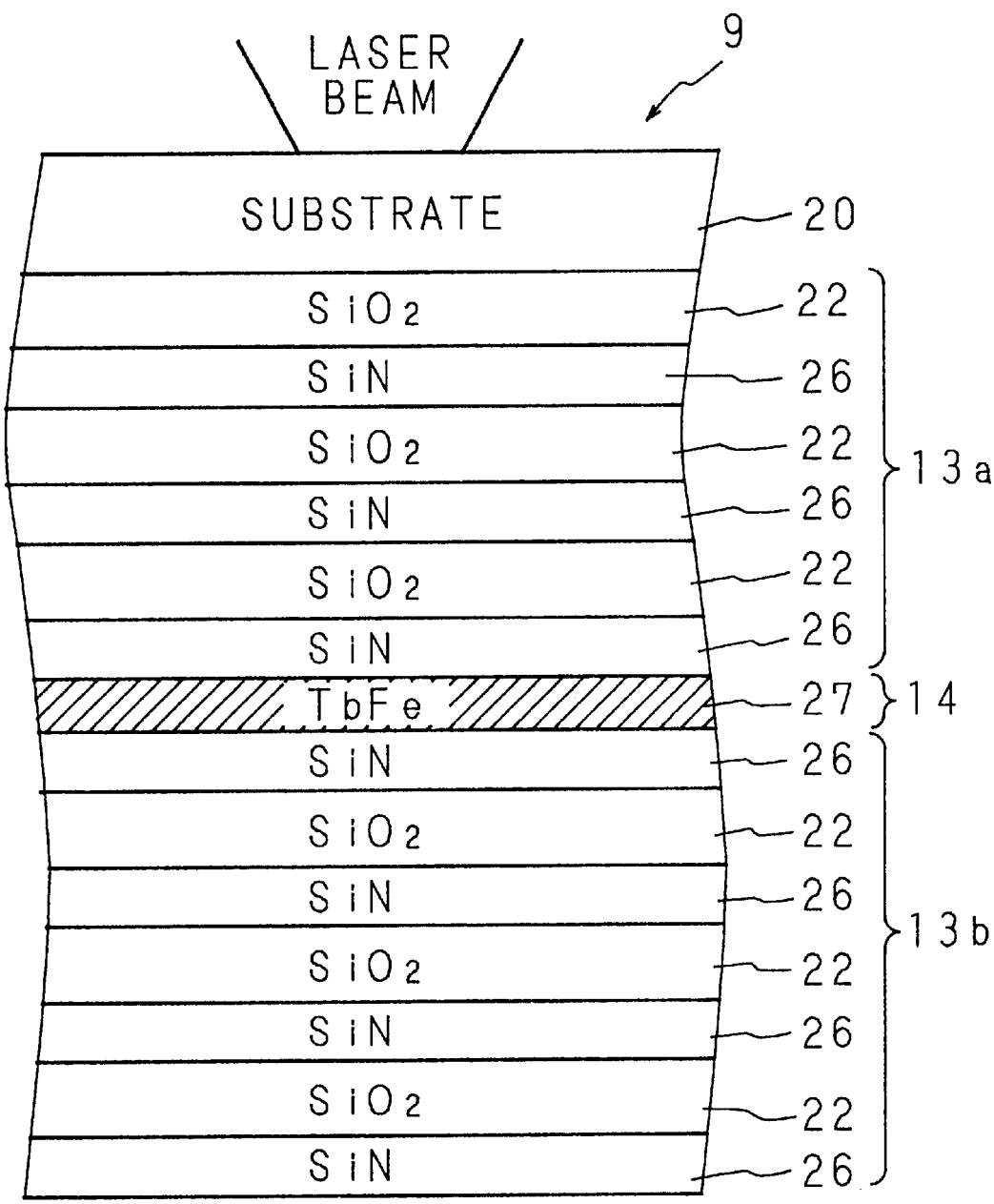
FIG. 26 is a sectional view for showing the layer structure of a magneto-optical recording medium according to a tenth embodiment.

A magneto-optical recording medium in which a reflection layer closer to the incident face of a laser beam includes a different total number of first dielectric layers and second dielectric layers from the number of those included in another reflection layer is manufactured, so as to check the Kerr rotation angle and the reflectance of this magneto-optical recording medium. FIG. 26 is a sectional view for showing the layer structure of this magneto-optical recording medium. As is shown in FIG. 26, the magneto-optical recording medium 9 includes a first reflection layer 13a formed by alternately stacking three $SiO_2$ layers and three SiN layers, a center layer 14 consisting of a TbFe layer 27, and a second reflection layer 13b formed by alternately stacking four SiN layers and three $SiO_2$ layers stacked in this order on a substrate 20. The thicknesses and the forming conditions of the TbFe layer, the $SiO_2$ layer and the SiN layer are the same as those listed in TABLE 7, and the description is omitted.

The magneto-optical recording medium 9 is irradiated with a laser beam, so as to check the dependency, on the wavelength of the laser beam, of the Kerr rotation angle and the reflectance. As a result, it is found that the Kerr rotation angle is as large as 10 degrees, while the reflectance is approximately 7%, at the wavelength $\lambda$ of the laser beam of 750 nm. In considering that the magneto-optical recording medium 8 of the ninth embodiment has a reflectance of approximately 5% at the wavelength of 750 nm (see FIG. 25), it is obvious that the magneto-optical recording medium 9 of this embodiment has a higher reflectance. Since the total number of the dielectric layers included in the second reflection layer 13b is larger than that in the first reflection layer 13a, the first reflection layer 13a closer to the incident face has a lower reflectance than the second reflection layer 13b farther from the incident face. As a result, while attaining the Kerr rotation angle at substantially the same level as that of the ninth embodiment, the magneto-optical recording medium of this embodiment is improved in its reflectance.

Also, the magneto-optical recording medium 9 of this embodiment is irradiated with a laser beam through the second reflection layer 13b, so as to check the magneto-optical effect. As a result, at the wavelength $\lambda$ of the laser beam of 750 nm, the Kerr rotation angle is 8 degrees and the reflectance is approximately 3%, which are degraded as compared with those obtained in the aforementioned case where the laser beam irradiates through the first reflection layer 13a. This seems to be because light localized in the vicinity of the center layer 14 does not return to the incident face owing to the higher reflectance of the second reflection layer 13b than that of the first reflection layer 13a.

Embodiment 11

Figure 27:
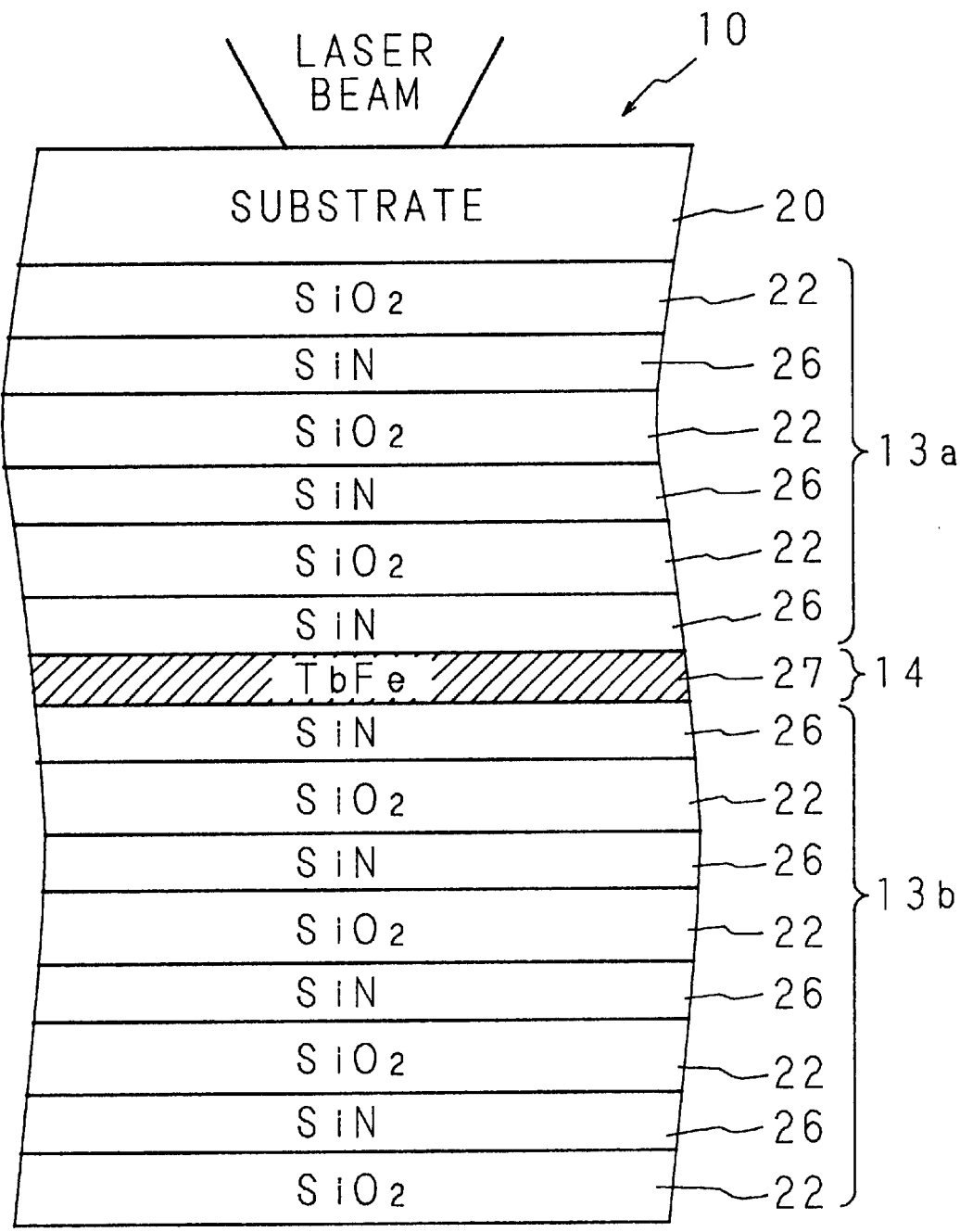
FIG. 27 is a sectional view for showing the layer structure of a magneto-optical recording medium according to an eleventh embodiment.

A magneto-optical recording medium having a reflectance improved by adopting another structure will be described in this embodiment. FIG. 27 is a sectional view for showing the layer structure of the magneto-optical recording medium of the eleventh embodiment. As is shown in FIG. 27, the magneto-optical recording medium 10 includes a first reflection layer 13a formed by alternately stacking $SiO_2$ and SiN with Np of 3, a center layer 14 consisting of a TbFe layer 27, and a second reflection layer 13b formed by alternately stacking SiN and $SiO_2$ with Np of 4 stacked in this order on a substrate 20. The thicknesses and the forming conditions of the TbFe layer, the $SiO_2$ layer and the SiN layer are the same as those listed in TABLE 7, and the description is omitted.

The magneto-optical recording medium 10 is irradiated with a laser beam, so as to check the dependency, on the wavelength of the laser beam, of the Kerr rotation angle and the reflectance. As a result, at the wavelength $\lambda$ of the laser beam of 750 nm, the reflectance is approximately 8% and the Kerr rotation angle is as large as 10 degrees. In considering that the magneto-optical recording medium 8 of the ninth embodiment has a reflectance of approximately 5% at the wavelength of 750 nm (see FIG. 25), it is obvious that the magneto-optical recording medium of this embodiment has a higher reflectance. Since the number Np of the pairs of dielectric layers in the second reflection layer 13b is larger than that in the first reflection layer 13a, the first reflection layer 13a closer to the incident face has a lower reflectance than the second reflection layer 13b farther from the incident face. As a result, while attaining the Kerr rotation angle at substantially the same level as that of the ninth embodiment, the magneto-optical recording medium of this embodiment can be improved in its reflectance.

Embodiment 12

In each of the aforementioned eighth through eleventh embodiments, the dielectric layer included in each reflection layer is formed to have a thickness of $\lambda/(4M)$, wherein $\lambda$ indicates the wavelength of incident light and M indicates the refractive index of the dielectric. When a metal layer or an alloy layer is used as the center layer 14 of the magneto-optical recording medium 7 of the eighth embodiment, it is found that the actual resonance wavelength $\lambda$ is shifted to be longer. This seems to be because the optical length of the center portion of the medium, namely, the center layer 14 and the plural dielectric layers sandwiching the center layer 14, is shifted to be longer. Now, description will be given on a magneto-optical recording medium according with the actual resonance wavelength in which each dielectric layer has a thickness smaller than $\lambda/(4M)$.

First, a virtual wavelength $\lambda v$ is set and a thickness of each dielectric layer is calculated, thereby obtaining the resonance wavelength of the magneto-optical recording medium, For example, in assuming that a desired resonance wavelength is 680 nm, the magneto-optical recording mediums 8 of the ninth embodiment are manufactured by setting the virtual wavelengths $\lambda v$ at 650 nm and 610 nm, respectively. TABLE 8 lists thicknesses $\lambda v/(4M)$ of each $SiO_2$ layer and each SiN layer and the resonance wavelengths thus attained.

TABLE 8

On the basis of TABLE 8, it is found that the actual resonance wavelength $\lambda$ can be 680 nm when the virtual wavelength $\lambda v$ is set at 610 nm. At this point, the thicknesses of the $SiO_2$ layer and the SiN layer are 95 nm and 58 nm, respectively, both of which are smaller than $\lambda/(4M)$. In view of this finding, when a metal layer or an alloy layer is used as the center layer 14, a magneto-optical recording medium according with the resonance wavelength of reproducing light can be manufactured by setting the thickness of each dielectric layer included in the reflection layer at a value smaller than $\lambda/(4M)$.

Embodiment 13

A magneto-optical recording medium having a higher recording density will now be described.

First, a magneto-optical recording medium including first and second recording layers each consisting of a dielectric multilayer of $SiO_2/SiN$ with Np of 4 is manufactured, and the Kerr rotation angle and the reflectance are checked. In this magneto-optical recording medium, a TbFe layer, a $SiO_2$ layer and a SiN layer have thicknesses of 30 nm, 106 nm and 63 nm, respectively, so as to attain the resonance wavelength of 680 nm. The magneto-optical recording medium is irradiated with a laser beam, so as to check the dependency, on the wavelength of the laser beam, of the Kerr rotation angle and the reflectance. As a result, it is found that the reflectance is approximately 5% and the Kerr rotation angle is as large as 16 degrees at a wavelength λ of the laser beam of 680 nm.

This dielectric multilayer is formed on a grooved substrate for a magneto-optical disk, and the recording/reproducing characteristic of the magneto-optical disk is checked. The substrate is made from polycarbonate, the width of a land and a groove is 0.6 μm and a groove pitch is 1.2 μm. A pattern with a pitch of 1.0 μm and a mark length of 0.5 μm is recorded in this disk by using a read/write tester, and the recorded pattern is reproduced. At this point, a recording power is 7 mW and a reproducing power is 2 mW. The object lens of the read/write tester has NA of 0.55. As a result of reproducing the pattern, it is found that the obtained reproducing signal has an amplitude eight times as large as that obtained by a conventional medium. This is because the Kerr effect of the dielectric multilayer working as a recording layer of this magneto-optical recording medium is larger than that of a conventional recording layer.

Then, a pattern of a recording mark is recorded in the triple recording density in a magneto-optical recording medium having the same layer structure, and the recorded pattern is reproduced. The amplitude of the obtained reproducing signal is divided into eight levels. The respective levels can be definitely distinguished. When a recording mark of three bits corresponding to each level is checked, it is found that a specific recording mark pattern corresponds to each level. In this manner, the reproducing signal of the magneto-optical recording medium can be detected on the eight levels so as to reproduce a recording mark of three bits corresponding to each level. Accordingly, information recorded in substantially the triple density as compared with the density in a conventional medium can be reproduced.

Thus, since the magneto-optical recording medium of this embodiment has a large Kerr rotation angle, large reproducing output power can be obtained. As a result, it is very effective to divide the amplitude of the reproducing signal into multivalued levels.

Embodiment 14

Next, a method of obtaining the reproducing signal of the magneto-optical recording medium of the thirteenth embodiment by directly detecting a polarization angle will be described.

Figure 28:
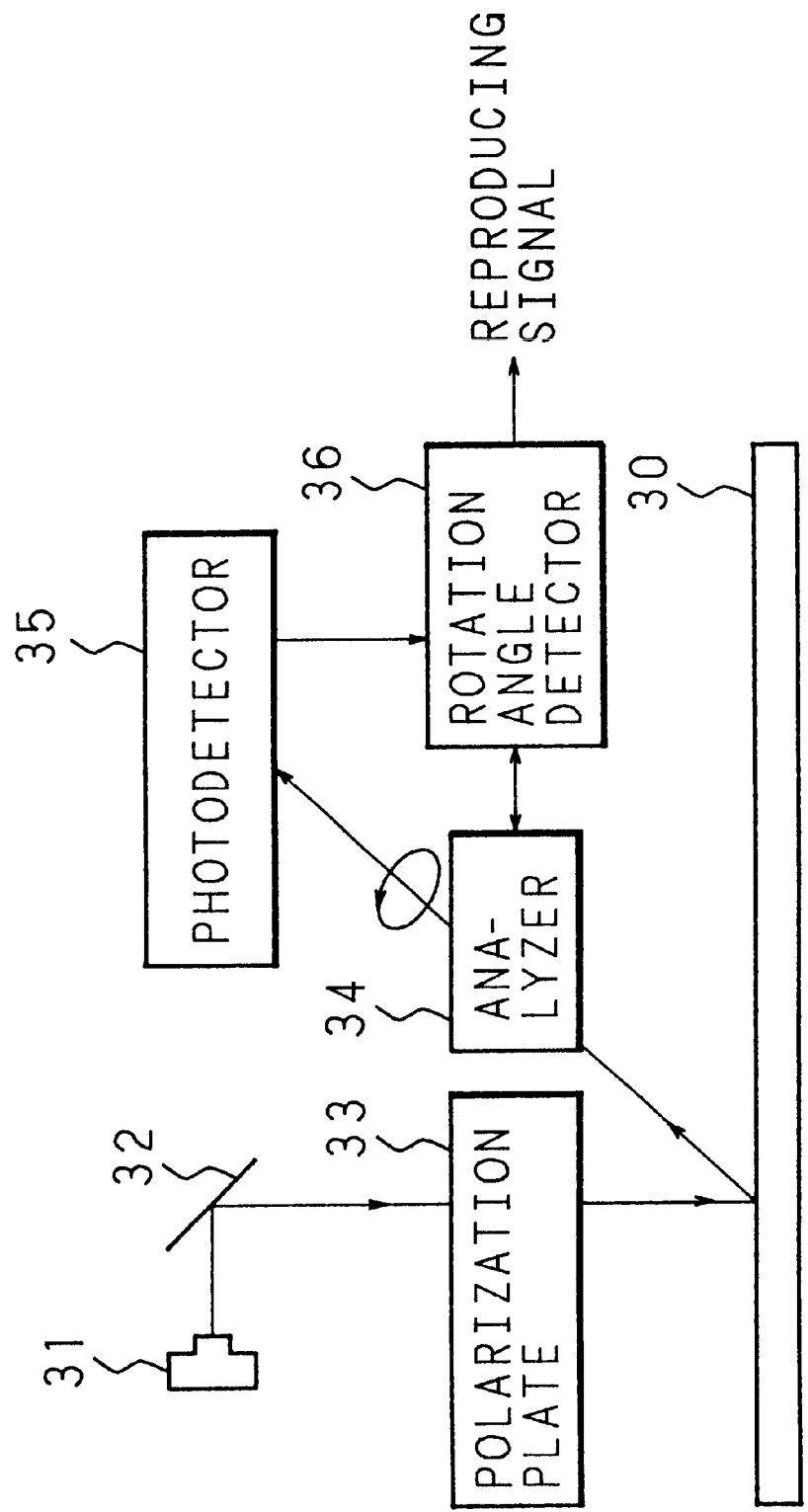
FIG. 28 is a block diagram for showing a main part of a reproducing apparatus according to a fourteenth embodiment.

FIG. 28 is a block diagram for showing a main part of a reproducing apparatus for obtaining a reproducing signal of a magneto-optical recording medium through detection of a Kerr rotation angle. In FIG. 28, a reference numeral 31 denotes a laser beam source for emitting a laser beam with a predetermined wavelength. The laser beam emitted by the laser beam source 31 is reflected by a reflection plate 32 such as a beam splitter and is polarized by a polarization plate 33, so as to irradiate a magneto-optical recording medium 30. Light beam reflected by the magneto-optical recording medium 30 enters an analyzer 34. The analyzer 34 is disposed rotatably about a transmission axis of the light, so that light having passed through the analyzer 34 enters a photodetector 35. The analyzer 34 is connected with a rotation angle detector 36, and the rotation angle detector 36 detects the rotation angle of the analyzer 34 and outputs a reproducing signal in response to a detection signal supplied from the photodetector 35. The rotation speed of the analyzer 34 is higher than a transfer speed.

The rotation angle of the analyzer 34 obtained when the output of the photodetector 35 has the maximum value corresponds to the Kerr rotation angle, which is detected by the rotation angle detector 36 and is output as the reproducing signal. In using the dielectric multilayer having a comparatively small reflectance as that of the eighth embodiment, the intensity variation of the output of the photodetector is small, and hence, it is difficult to obtain a highly accurate reproducing signal. However, in this embodiment, since the Kerr rotation angle is detected to be output as the reproducing signal, an output at a high level can be obtained regardless of the reflectance. Also, high density recording/reproducing can be realized by dividing the output into six levels.

Embodiment 15

Figure 29:
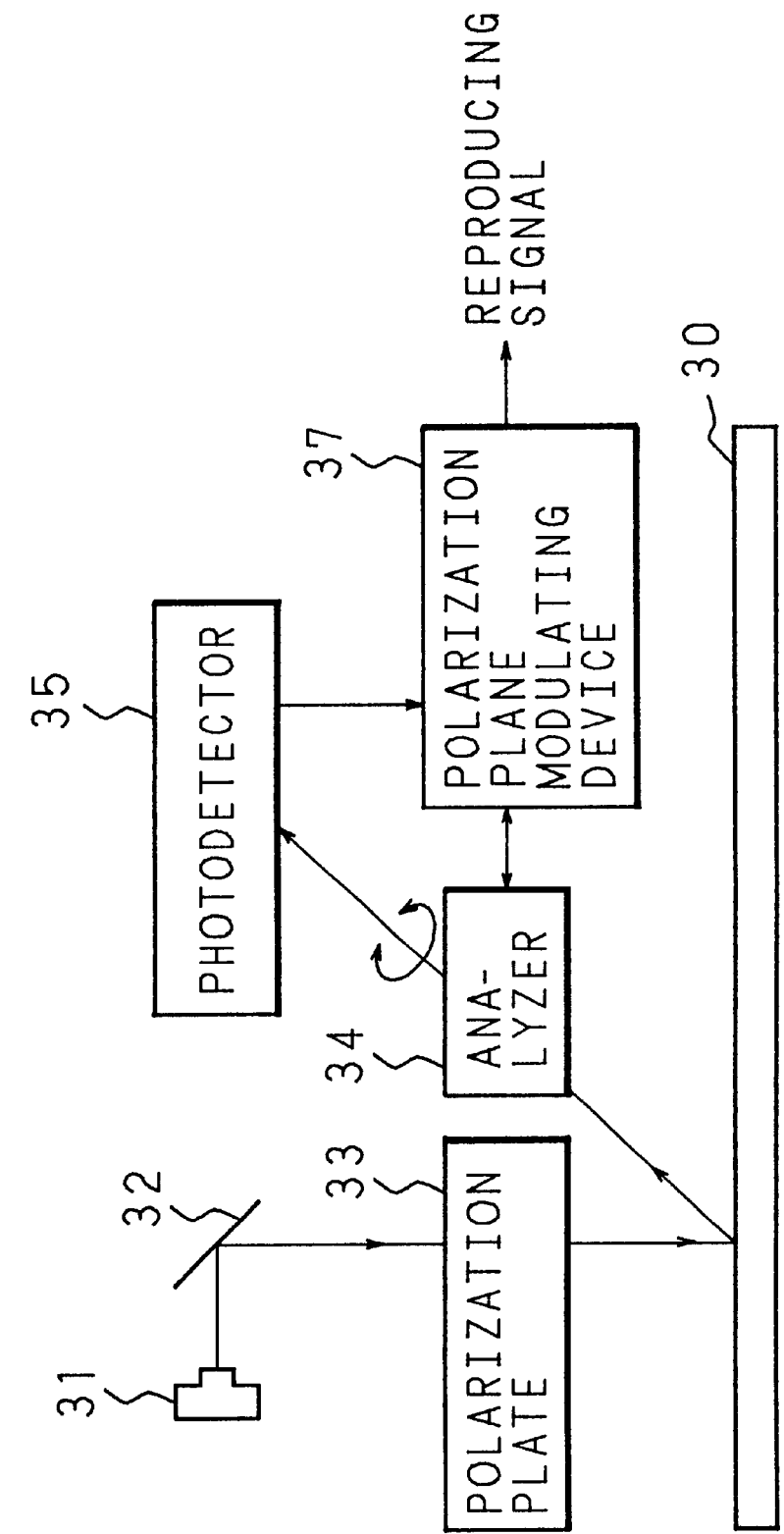
FIG. 29 is a block diagram for showing a main part of a reproducing apparatus according to a fifteenth embodiment.

In the fourteenth embodiment, the analyzer 34 is rotated about the transmission axis of the light, which does not limit the invention. FIG. 29 is a block diagram for showing a main part of another reproducing apparatus for obtaining a reproducing signal of a magneto-optical recording medium through the detection of the Kerr rotation angle. In FIG. 29, a reference numeral 34 denotes an analyzer, which is disposed to be invertible about the transmission axis of the light. Light having passed through the analyzer 34 enters a photodetector 35. The analyzer 34 is connected with a polarization plane modulating device 37, so that the polarization plane modulating device 37 can further polarize the light reflected by a magneto-optical recording medium 30 and output a reproducing signal in response to a detection signal supplied from the photodetector 35. Except for the above-described elements, the structure of the reproducing apparatus of this embodiment is the same as that of the fourteenth embodiment, and the description is omitted.

The polarization angle of the polarization plane modulating device 37 obtained when the output value of the photodetector 35 is 0 is output as the Kerr rotation angle. As a result, similarly to the fourteenth embodiment, since the Kerr rotation angle is detected to be output as the reproducing signal, an output at a high level can be attained regardless of the reflectance. Also, the high density recording/reproducing can be realized by dividing the output into six levels.

In each of the fourteenth and fifteenth embodiments, the reproducing signal is detected on eight divided levels, which does not limit the invention. The invention is applicable to the general detection on binary levels.

In each of the aforementioned embodiments, each of the first and second reflection layers, namely, each regularly stacked layer, includes two dielectric substances, which does not limit the invention. The same effects can be attained when three or more dielectric substances are stacked as the reflection layer.

Furthermore, in the method of reproducing a magneto-optical recording medium of this invention, the reproducing signal is divided into three or more levels so as to obtain an information pattern corresponding to each level. Therefore, information recorded in a high density can be reproduced. Moreover, since the rotation angle of the polarization plane of light irradiating the magneto-optical recording medium is directly obtained to be used as a reproducing signal, the reproducing signal can be output with higher power.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

Layer structure: $SiO_2/TiO_2/SiO_2/TiO_2/BiDyFeAlO/TiO_2/SiO_2/TiO_2/SiO_2$

| Layer | Targe | Sputtering | Gas pressure | Electric power | Temperature of substrate |
|---|---|---|---|---|---|
| $SiO_2$ | $SiO_2$ | RF | 0.5 Pa | 1 kW | room temp. |
| $TiO_2$ | $TiO_2$ | RF | 0.5 Pa | 1 kW | room temp. |
| Bi-DIG | $BiDy_2Fe_3Al_2O_{12}$ | RF | 1.0 Pa | 0.6 kW | 300° C. |

TABLE 2

Layer structure: Substrate/$SiO_2/TiO_2/SiO_2/TiO_2/BiDyFeAlO/TiO_2/SiO_2/TiO_2/SiO_2$

| Layer | Targe | Sputtering | Gas pressure | Electric power | Temperature of substrate |
|---|---|---|---|---|---|
| $SiO_2$ | $SiO_2$ | RF | 0.5 Pa | 1 kW | room temp. |
| $TiO_2$ | $TiO_2$ | RF | 0.5 Pa | 1 kW | room temp. |
| Bi-DIG | $BiDy_2Fe_3Al_2O_{12}$ | RF | 1.0 Pa | 0.6 kW | 300° C. |

TABLE 3

Layer structure: Substrate/$SiO_2/TiO_2/SiO_2/TiO_2/TbFeCo/TiO_2/SiO_2/TiO_2/SiO_2$

| Layer | Targe | Sputtering | Gas pressure | Electric power | Temperature of substrate |
|---|---|---|---|---|---|
| $SiO_2$ | $SiO_2$ | RF | 0.5 Pa | 1 kW | room temp. |
| $TiO_2$ | $TiO_2$ | RF | 0.5 Pa | 1 kW | room temp. |
| TbFeCo | $Tb_{21}Fe_{70}Co_9$ | DC | 2.0 Pa | 1 kW | room temp. |

TABLE 4

Layer structure: Substrate/$SiO_2/TiO_2/SiO_2/TiO_2/SiO_2/TiO_2/$TbFeCo/$TiO_2/SiO_2/TiO_2/SiO_2/TiO_2/SiO_2/Al$

| Layer | Targe | Sputtering | Gas pressure | Electric power | Temperature of substrate |
|---|---|---|---|---|---|
| $SiO_2$ | $SiO_2$ | RF | 0.5 Pa | 1 kW | room temp. |
| $TiO_2$ | $TiO_2$ | RF | 0.5 Pa | 1 kW | room temp. |
| TbFeCo | $Tb_{21}Fe_{70}Co_9$ | DC | 2.0 Pa | 1 kW | room temp. |

TABLE 5

Layer structure: Substrate/$SiO_2/TiO_2/SiO_2/TiO_2/SiO_2/TiO_2/$TbFeCo/$TiO_2/SiO_2/TiO_2/SiO_2/TiO_2/SiO_2/Al$

| Layer | Targe | Sputtering | Gas pressure | Electric power | Temperature of substrate |
|---|---|---|---|---|---|
| $SiO_2$ | $SiO_2$ | RF | 0.5 Pa | 1 kW | room temp. |
| $TiO_2$ | $TiO_2$ | RF | 0.5 Pa | 1 kW | room temp. |
| TbFeCo | $Tb_{21}Fe_{70}Co_9$ | DC | 2.0 Pa | 1 kW | room temp. |

TABLE 6

Layer structure: Substrate/Bi-YIG/$SiO_2$/Bi-YIG/$SiO_2$/Bi-YIG/$SiO_2$/Bi-YIG/$SiO_2$/Bi-YIG/$SiO_2$/Bi-YIG/$SiO_2$/Bi-YIG/$SiO_2$/Bi-YIG

| Layer | Target | Sputtering | Gas pressure | Electric power | Temperature of substrate |
|---|---|---|---|---|---|
| $SiO_2$ | $SiO_2$ | RF | 0.5 Pa | 1 kW | room temp. |
| Bi-DIG | $BiDy_2Fe_3Al_2O_{12}$ | RF | 1.0 P | 0.6 kW | 300° C. |

TABLE 7

Layer structure: Substrate/$SiO_2$/SiN/$SiO_2$/SiN/TbFe/SiN/$SiO_2$/SiN/$SiO_2$

| Layer | Target | Forming gas | Gas pressure | Electric power | Layer thickness |
|---|---|---|---|---|---|
| $SiO_2$ | $SiO_2$ | Ar | 0.5 Pa | 1.5 kW | 107 nm |
| SiN | Si | Ar + $N_2$ | 0.3 Pa | 1.0 kW | 63 nm |
| TbFe | TbFe | Ar | 0.5 Pa | 1.0 kW | 40 nm |

TABLE 8

Layer structure: Substrate/$SiO_2$/SiN/$SiO_2$/SiN/$SiO_2$/SiN/TbFe/SiN/$SiO_2$/SiN/$SiO_2$/SiN/$SiO_2$

| Virtual wavelength | Layer | Layer thickness | Resonance wavelength |
|---|---|---|---|
| 650 nm | $SiO_2$ | 102 nm | 710 nm |
|  | SiN | 60 nm |  |
|  | TbFe | 40 nm |  |
| 610 nm | $SiO_2$ | 95 nm | 680 nm |
|  | SiN | 58 nm |  |
|  | TbFe | 40 nm |  |

What is claimed is:

1. A magneto-optical recording medium from which information is reproduced through irradiation with a light beam, comprising:

a first stacked layer formed by alternately stacking different dielectric substances, where every layer of the same dielectric substance is of the same thickness;

a magnetic layer, having a thickness that differs from that of said dielectric layers, said magnetic layer for recording and storing information; and a second stacked layer formed by alternately stacking different dielectric substances, where every layer of the same dielectric substance is of the same thickness;

wherein the first stacked layer, the magnetic layer and the second stacked layer are stacked in this order;

wherein each of the first stacked layer and the second stacked layer includes three or more pairs of the different dielectric substances alternately stacked.

2. The magneto-optical recording medium according to claim 1, wherein the number of pairs of the different dielectric substances alternately stacked in the first stacked is different form the number of pairs of the different dielectric substances alternately stacked in the second stacked layer.

3. The magneto-optical recording medium according to claim 1, wherein the numbers of the stacked dielectric substances in the first stacked layer and the second stacked layer are different from each other.

4. The magneto-optical recording medium according to claim 1, wherein $SiO_2$ and SiN are used as the dielectric substances.

5. The magneto-optical recording medium according to claim 1, wherein each of the dielectric substances has a thickness defined on the basis of a wavelength of light used in optical reproduction and a refractive index of the dielectric substance as follows:

$$t < \lambda/(4M)$$

wherein t indicated the thickness of the dielectric substance, λ indicates the wavelength of the light and M indicates the refractive index of the dielectric substance.

6. A method of reproducing a magneto-optical recording medium, the magneto-optical recording medium from which information is reproduced through irradiation with a light beam including a first stacked layer formed by alternately stacking different dielectric substances where every layer of the same dielectric substance is of the same thickness; a magnetic layer, having a thickness that differs from that of said dielectric layers, said magnetic layer for recording and storing information; and a second stacked layer formed by alternately stacking different dielectric substances, where every layer of the same dielectric substance is of the same thickness, the first stacked layer, the magnetic layer and the second stacked layer being stacked in this order, and the number of pairs of the different dielectric substances alternately stacked in the first stacked layer being different from the number of pairs of the different dielectric substances alternately stacked in the second stacked layer, the method comprising the steps of:
  irradiating a face of the magneto-optical recording medium, with a light beam, closer to either the first or the second stacked layer including a smaller number of pairs of the dielectric substances; and
  reproducing information recorded in the magnetic layer on the basis of reflected light of the light beam.

7. A method of reproducing a magneto-optical recording medium, the magneto-optical recording medium from which information is reproduced through irradiation with a light beam including a first stacked layer formed by alternately stacking different dielectric substances where every layer of the same dielectric substance is of the same thickness; a magnetic layer, having a thickness that differs from that of said dielectric layers, said magnetic layer for recording and storing information; and a second stacked layer formed by alternately stacking different dielectric substances, where every layer of the same dielectric substance is of the same thickness, the first stacked layer, the magnetic layer and the second stacked layer being stacked in this order, and the first stacked layer and the second stacked layer including different numbers of the stacked dielectric substances, the method comprising the steps of:
  irradiating a face of the magneto-optical recording medium, with a light beam, closer to either the first or the second stacked layer including a smaller number of the stacked dielectric substances; and
  reproducing information recorded in the magnetic layer on the basis of reflected light of the light beam.

8. A method of reproducing a magneto-optical recording medium, the magneto-optical recording medium including a first stacked layer formed by alternately stacking different dielectric substances where every layer of the same dielectric substance is of the same thickness; a magnetic layer, having a thickness that differs from that of said dielectric layers, said magnetic layer for recording and storing information; and a second stacked layer formed by alternately stacking different dielectric substances, where every layer of the same dielectric substance is of the same thickness, the first stacked layer, the magnetic layer and the second stacked layer being stacked in this order, the method comprising the steps of:
  obtaining a reproducing signal on the basis of a beam light reflected on the magneto-optical recording medium;
  dividing the obtained reproducing signal into three or more levels; and
  reproducing information on the basis of the reproducing signal by using previously obtained information patterns corresponding to the respective levels.

9. A method of reproducing a magneto-optical recording medium, the magneto-optical recording medium from which information is reproduced through irradiation with a light beam including a first stacked layer formed by alternately stacking different dielectric substances where every layer of the same dielectric substance is of the same thickness; a magnetic layer, having a thickness that differs from that of said dielectric layers, said magnetic layer for recording and storing information; and a second stacked layer formed by alternately stacking different dielectric substances, where every layer of the same dielectric substance is of the same thickness, the first stacked layer, the magnetic layer and the second stacked layer being stacked in this order, the method comprising the steps of:
  receiving a light beam reflected on the magneto-optical recording medium;
  detecting a rotation angle of a polarization plane of the received light beam; and
  reproducing information by using the detected rotation angle as a reproducing signal.

10. The method of reproducing a magneto-optical recording medium according to claim 9,
  wherein, in the step of receiving the reflected light beam, the reflected light beam having passed through an analyzer rotatable about a light transmission axis is received, and
  in the step of detecting the rotation angle of the polarization plane, the rotation angle of the polarization plane is detected on the basis of a rotation angle of the analyzer.

11. The method of reproducing a magneto-optical recording medium according to claim 9,
  wherein, in the step of receiving the reflected light beam, the reflected light beam having passed through an analyzer invertible about a light transmission axis in a predetermined angle range is received, and
  in the step of detecting the rotation angle of the polarization plane, the rotation angle of the polarization plane is detected on the basis of a rotation angle of the analyzer.

* * * * *

UNITED STATES PATENT AND TRADEMARK OFFICE
CERTIFICATE OF CORRECTION

PATENT NO.    : 6,421,303 B1
DATED         : July 16, 2002
INVENTOR(S)   : Inoue et al.

It is certified that error appears in the above-identified patent and that said Letters Patent is hereby corrected as shown below:

<u>Column 24,</u>
Line 57, delete "first stacked is" and insert -- first stacked layer is --.

Signed and Sealed this

Twenty-fifth Day of February, 2003

JAMES E. ROGAN
*Director of the United States Patent and Trademark Office*